US011601453B2

(12) United States Patent
Janakiraman

(10) Patent No.: US 11,601,453 B2
(45) Date of Patent: Mar. 7, 2023

(54) METHODS AND SYSTEMS FOR ESTABLISHING SEMANTIC EQUIVALENCE IN ACCESS SEQUENCES USING SENTENCE EMBEDDINGS

(71) Applicant: HEWLETT PACKARD ENTERPRISE DEVELOPMENT LP, Houston, TX (US)

(72) Inventor: Ramsundar Janakiraman, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 583 days.

(21) Appl. No.: 16/670,536

(22) Filed: Oct. 31, 2019

(65) Prior Publication Data
US 2021/0136096 A1 May 6, 2021

(51) Int. Cl.
G06F 40/30 (2020.01)
G06F 40/205 (2020.01)
H04L 9/40 (2022.01)

(52) U.S. Cl.
CPC .......... H04L 63/1425 (2013.01); G06F 40/30 (2020.01); *G06F 40/205* (2020.01)

(58) Field of Classification Search
CPC ..... H04L 63/1425; G06F 40/30; G06F 40/205
USPC .......................................................... 726/23
See application file for complete search history.

(56) References Cited

U.S. PATENT DOCUMENTS

| 9,311,386 | B1 | 4/2016 | Song et al. |
| 9,769,208 | B2 | 9/2017 | Chari et al. |
| 9,852,208 | B2 | 12/2017 | Chari et al. |
| 10,268,752 | B2 | 4/2019 | Liu |

(Continued)

OTHER PUBLICATIONS

Iyyer et al., "Deep Unordered Composition Rivals Syntactic Methods for Text Classification", Proceedings of the 53rd Annual Meeting of the Association for Computational Linguistics and the 7th International Joint Conference on Natural Language Processing, Jul. 26-31, 2015, pp. 1681-1691.

(Continued)

*Primary Examiner* — Thanh T Le
(74) *Attorney, Agent, or Firm* — Sheppard Mullin Richter & Hampton LLP

(57) ABSTRACT

Systems and methods are provided for utilizing natural language process (NLP), namely semantic learning approaches in network security. Techniques include analyzing network transaction records to form a corpus related to a semantics of network activity. The corpus includes formulated network sentences, representing sequences of network entities that are accessed in the network. A corpus of network sentences can include sequences of servers accessed by each user. A network sentence embeddings model can be trained on the corpus. The network sentence embeddings model includes an embedding space of text that captures the semantic meanings of the network sentences. In sentence embeddings, network sentences with equivalent semantic meanings are co-located in the embeddings space. Further, proximity measures in the embedding space can be used to identify whether network sentences (e.g., access sequences), are semantically equivalent. Using network sentence embeddings model, equivalent semantics of access can be established to efficiently detect anomalies.

20 Claims, 9 Drawing Sheets

(56) References Cited

U.S. PATENT DOCUMENTS

| | | | |
|---|---|---|---|
| 11,210,468 B2* | 12/2021 | Patel | G06N 3/0472 |
| 2017/0293725 A1* | 10/2017 | Liu | G06F 16/24522 |
| 2018/0248902 A1* | 8/2018 | Dãnilã-Dumitrescu | G06N 3/02 |
| 2019/0028557 A1* | 1/2019 | Modi | G06N 3/04 |
| 2019/0114417 A1* | 4/2019 | Subbarayan | G06N 20/00 |
| 2019/0149565 A1* | 5/2019 | Hagi | G06N 5/022 726/23 |
| 2019/0171792 A1* | 6/2019 | Manica | G06F 40/216 |
| 2020/0045049 A1* | 2/2020 | Apostolopoulos | H04L 63/102 |
| 2020/0184148 A1* | 6/2020 | Braunstein | G06F 40/205 |
| 2020/0193305 A1* | 6/2020 | Braunstein | G06N 5/025 |
| 2020/0285737 A1* | 9/2020 | Kraus | G06F 21/552 |
| 2020/0302018 A1* | 9/2020 | Turkkan | G06F 40/284 |
| 2021/0104234 A1* | 4/2021 | Zhang | G10L 15/197 |
| 2021/0124802 A1* | 4/2021 | Wang | G06F 40/30 |
| 2021/0234902 A1* | 7/2021 | Chandana | G06F 21/554 |

OTHER PUBLICATIONS

Building a Real-time Embeddings Similarity Matching System, (Web Page) https://cloud.google.com/solutions/machine-learning/building-real-time-embeddings-similarity-matching-system, Retrieved May 31, 2019, 29 Pgs.

Zhu, X. et al., Exploring Semantic Properties of Sentence Embeddings, Proceedings of the 56th Annual Meeting of the Association for Computational Linguistics (Short Papers), Jul. 15- 20, 2018, pp. 632-637, Association for Computational Linguistics, Melbourne, Australia.

Zhuo, X. et al., Network Intrusion Detection Using Word Embeddings, 2017 IEEE International Conference on Big Data (BIGDATA), Dec. 11-14, 2017, 10 Pgs.

* cited by examiner

| File Edit Format View Help | | | | January 14, 2018 |
|---|---|---|---|---|
| 350 ServerName | 351 DatabaseName | 352 LogsGenerated | 353 DurationInSeconds | 354 Usernames | 355 TimeStamp |
| ex-08-07 | ex-08-db151 | 135 | 277213 | UserA | 09:01:23 |
| ex-03-05 | ex-03-db039 | 115 | 86394 | UserB | 09:01:44 |
| ex-08-11 | ex-08-db240 | 2068 | 172839 | UserB | 09:01:49 |
| ex-02-09 | ex-02-db127 | 118 | 86405 | UserA | 09:01:52 |
| ex-04-10 | ex-04-db223 | 26 | 86405 | UserD | 09:02:06 |
| ex-05-03 | ex-05-db242 | 845 | 68407 | UserC | 09:02:07 |
| ex-09-05 | ex-09-db251 | 4705 | 316826 | UserD | 09:02:09 |
| ex-01-07 | ex-01-db021 | 227 | 190798 | UserA | 09:02:30 |
| ex-08-07 | ex-08-db061 | 592 | 82792 | UserB | 09:02:38 |
| ex-01-09 | ex-01-db217 | 4635 | 410411 | UserC | 09:02:54 |
| ex-03-02 | ex-03-db242 | 4717 | 597654 | UserC | 09:03:23 |
| ex-08-11 | ex-08-db178 | 1885 | 172807 | UserC | 09:06:13 |
| ex-08-07 | ex-08-db100 | 10134 | 597604 | UserD | |

FIG. 3

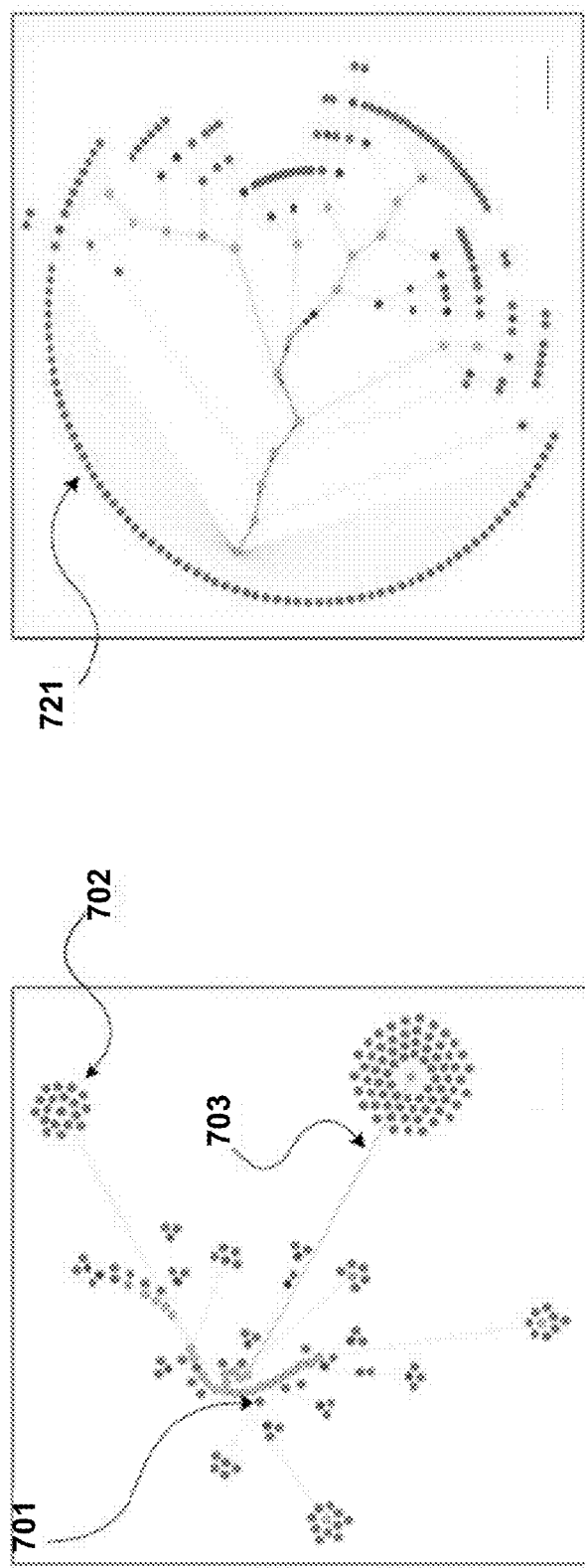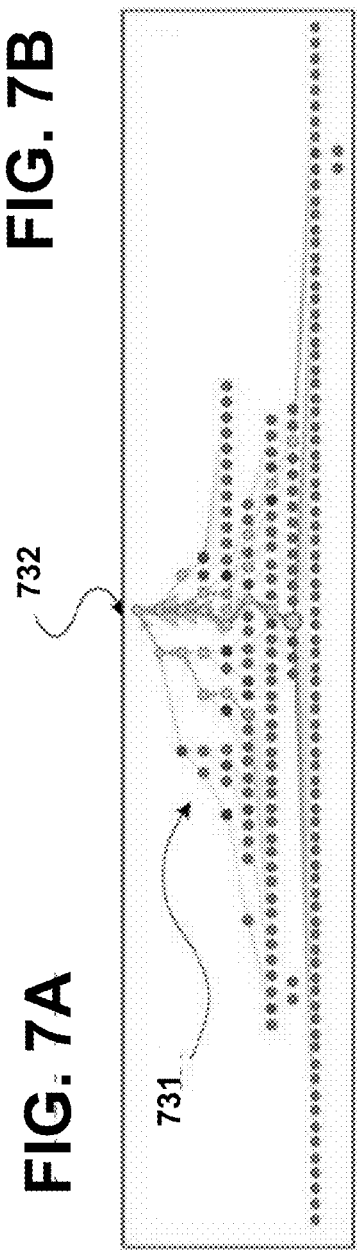
FIG. 7A
FIG. 7B
FIG. 7C

METHODS AND SYSTEMS FOR ESTABLISHING SEMANTIC EQUIVALENCE IN ACCESS SEQUENCES USING SENTENCE EMBEDDINGS

CROSS REFERENCE TO RELATED APPLICATIONS

This application is related to U.S. patent application Ser. No. 16/374,728 filed on Apr. 3, 2019, entitled "METHODS AND SYSTEMS FOR DEVICE GROUPING WITH INTERACTIVE CLUSTERING USING HIERARCHICAL DISTANCE ACROSS PROTOCOLS", which is hereby incorporated by reference herein in its entirety, U.S. patent application Ser. No. 16/513522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference in its entirety, and U.S. patent application Ser. No. 16/563,669 filed on Sep. 6, 2019 entitled "METHODS AND SYSTEMS FOR CREATING MULTI-DIMENSIONAL BASELINES FROM NETWORK CONVERSATION USING SEQUENCE PREDICTION MODELS", which is hereby incorporated by reference herein in its entirety herein in its entirety.

DESCRIPTION OF RELATED ART

In the realm of network security, it may be beneficial for security analytics products to increase the accuracy in the results they provide, as a way of gaining customer trust and raising confidence in use of the products themselves. As an example, there may be significant value in the area of network security for software that includes the capability to differentiate outliers that may be captured (but do not verifiably indicate a security threat) from the valid detected anomalies within the network, in a robust manner. Furthermore, with various advancements in Natural Language Processing (NLP), for example pertaining to semantic learning and auto-encoding, it may be possible to leverage text-based analysis (e.g., learning semantics) in a manner that requires limited human interaction and further may be applied to highly automated processes, such as network monitoring.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates an example of a network transactions log including records relating to network activity in the communications network shown in FIG. 1, according to some embodiments.

FIGS. 7A-7C depict examples of network graphs generated using visualization aspects of the network analytics system disclosed herein, according to some embodiments.

Figure 1:
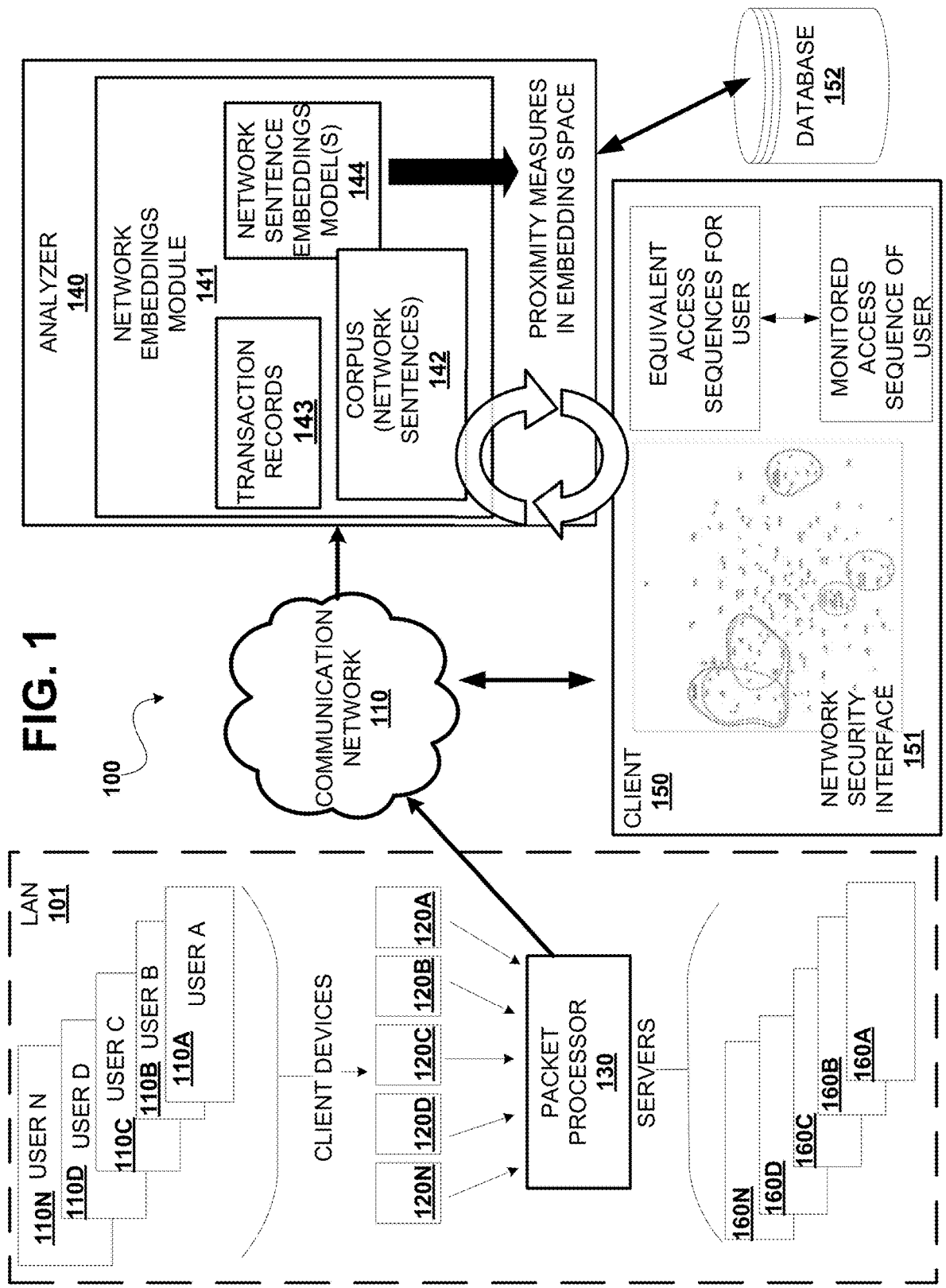
FIG. 1 illustrates an example of a system distributed across a communications network and including a network device implementing techniques for deriving network analytics using network sentence embeddings modeling, according to some embodiments.

The figures are not exhaustive and do not limit the present disclosure to the precise form disclosed.

DETAILED DESCRIPTION

Various embodiments described herein are directed to techniques and systems for using a semantic learning approach, namely sentence embeddings, which are a concept in Natural Language Processing (NLP) particularly in the realm of communication network security and/or network analytics. As background, NLP can be considered as a branch of an overarching concept of artificial intelligence (AI). In particular, NLP deals with the interaction between computers and humans that use natural language. NLP approaches can employ various techniques and models that ultimately aim to interpret human language, typically intelligible by humans, in a manner that also provides comprehensible value for computers for the purposes of data analysis. For example, some existing network monitoring systems have the capability to collect vast amounts of data from network traffic, such as interactions amongst entities within an enterprise network. Valuable insight may be gained from such data for purposes of network security and/or analytics, such as recognizing trends in access sequences, for example identifying users that frequently access the same servers and in the same sequential order (also referred to herein as an access sequence).

However, harnessing this insight from large amounts of data can present numerous challenges. Due to privacy concerns (e.g., personal identification information) and high data volume, data is often times unlabeled. As a result, data collected from the network may be disassociated from user identifiers, and other types of information that may provide valuable context with respect to security. Even further, separate networks can have distinct layouts, architectures, and operations that are specific to the respective network. These disparities between networks can grow even farther when observed across a large population (e.g., global business), which does not lend itself to an analysis approach (e.g., identifying similar server naming conventions) that can universally and effectively transfer across a plurality of networks (e.g., in terms of customer to customer, and also in terms of the deep learning transfer learning). With respect to particularly identifying access sequences, even if labels are applied to network data, it may still be impractical to label all possible sequences consisting of all possible combinations of servers that can be accessed. As an example, in a large network that includes many different servers (e.g., an enterprise network having multiple departments) attempting to label each sequence of servers that can be potentially accessed, for instance as either "suspicious" or "normal" based on a certain network security criteria, can be unfeasible due to the large magnitude of possible combinations of servers.

Advantageously, the disclosed embodiments can leverage NLP to represent network interactions as semantical structures (e.g., characters, words, sentences), with the network protocol being analogous to a spoken language defining the semantics. As a result, sophisticated and powerful NLP-driven semantic learning approaches that are typically used only in natural language applications (e.g., machine generated language translation, text/word prediction) can be applied to network interactions in a way that ultimately captures network behavior, recognizing similarities and frequency of occurrences between interactions on the network. Thus, the disclosed techniques can realize improvements over conventional network security techniques, by adding contextual worth to network data (e.g., recognizing that a particular user accesses the same servers daily, and that a future occurrence of users accessing the same servers is nominal network activity) that may otherwise be less meaningful.

As discussed herein, NLP can be generally described as multiple theory-driven computational techniques for the automatic analysis and representation of human language. NLP, referred to herein, may be processes that involve computers performing a wide range of natural language related tasks at various levels, such as parsing, and pattern recognition. Recent advancement in deep learning, for instance applying neural networks for dense vector representations, has further improved some NLP-based tasks. Closely related to this trend of deep learning within NLP is the concept of sentence embeddings.

In some approaches, NLP can be used to model complex natural language tasks. A drawback of some traditional NLP-based modeling techniques involves dimensionality. Dimensionality is often associated with challenges that are characteristic of analyzing and organizing data in high-dimensional spaces (often with hundreds or thousands of dimensions). This led to the emergence of models that learn distributed representations of words existing in low dimensional space, including embeddings. Embedding techniques (e.g., character, word, sentence, and paragraph) have been used for dimensionality reduction and sematic deduction to improve accuracy and performance improvements of NLP modes. Generally, embedding techniques have been employed to understand word relationships in a document or "corpus." As referred to herein, corpus can be defined as a body of words within a text or collection of texts. Accordingly, an advantage of embedding (e.g., distributional vectors) is its ability to capture similarity between words. Furthermore, measuring similarity between vectors is possible. Embeddings, due to these characteristics, can be useful as a processing layer in a deep learning model. Sentence embedding may be described as an approach that embeds sentences as vectors (on a sentence-level) in a dimensional space. Sentence embeddings may be able to encode a number of factors of a natural language sentence into a model, including semantic meaning, syntactic structure, and topic. A characteristic of sentence embeddings is "semantic localization", where a sentence position in the vector space can reflect the sentence's semantic meaning. This concept of "semantic localization" is discussed in further detail below in reference to FIG. 2. Similarly, using NLP, a "meaning" of a network sentence (or a semantic relationship between network interactions represented by network sentences) can be captured in the network sentence embedding space in a manner that is similar to embedding "meanings" of natural language sentences in conventional NLP semantic learning approaches.

In general, the disclosed network sentence embeddings techniques are related to the broader underlying concept of leveraging NLP approaches as described above (i.e., representing network interactions as semantical structures, such as characters, words, sentences, and the like). Although there are several approaches for embedding natural language, according to the example the embodiments described herein, NLP-driven sentence embeddings are particularly applied. For example, text extracted from network interactions are represented as semantical structures in a format that is similar to a natural language sentence (referred to herein a network sentences). Then, NLP-based sentence embedding approaches are applied to the formulated network sentences. By applying NLP-driven analysis to these network sentences (including information from network interactions), an implicit contextual relationship between network entities that are interacting with each other on the network can be captured. Identifying contextual relationships between entities (and further semantical relationships between sentences) allows the network data contained within to be analyzed in a context-rich manner that is useful in the realm of communication network security and/or network analytics. According to this NLP-based concept, the network protocols that facilitate communication between interacting network entities are analogous to a spoken language defining the semantics. Furthermore, embodiments of the disclosed techniques can formulate transaction records (related to an interaction between network entities) based on the network protocol as a "corpus" of network sentences, which are analogous to sentences in a natural language.

By applying the NLP-driven techniques disclosed herein, which particularly leverage the sentence embeddings approach NLP-driven techniques can be further applied to these networks sentence (embedded in the dimensional space) to analyze contextual relationships between network sentences based on the semantics, and establish any semantic equivalences that may exist between multiple network sentences. Understanding semantic equivalences between these network sentences (by monitoring the communications network over time) can, in turn, provide insight into "equivalency" in network activity. For example, determining access sequences, such as the servers that are accessed by a particular user, that are "equivalent" to the access sequences of another user on the network, may be valuable for purposes of network security.

There can be two practical applications for the above-mentioned semantic equivalency. Various network servers could be accessed in various orders, or as two sequences of different sets of servers in the same vicinity in an embedding space. A visual inspection might see them to be two different sets of accesses, but semantically, these accesses may be the same. For instance, there may be multiple accesses to servers in a document repository and patent portal, where the individual servers could be completely non overlapping. Simple embedding analysis of comparing relative distances gives a very good idea of these deviations. However, sentence embedding techniques can also be applied, allowing large volumes of sequences to be processed in a manner that scales up the operation.

Another use of sentence embeddings in NLP is to compare translation efficiency. The meaning of the sentences in two languages can correlate to embeddings in the same vicinity of the embedding space in both languages. Thus, the embeddings can being usable for identifying good (e.g., high accuracy) and bad (e.g., inaccuracies) translations. Then, in some cases, bad translations can be separated out and analyzed to determine a potential root cause of the inaccuracies resulting in a bad translation, such as the quality in input data or other reasons. These two types of applications, as alluded to above, may be further applied to network security. For example, sentence embeddings can be used for comparing two accesses and determining whether the accesses are similar. In a given enterprise, similar sets of access in two sites can indicate server equivalence in two sites. This equivalence of servers may not be apparently evident in pure embedding space only. Using sentence embeddings, parallels of multiple sites (may be even multiple customers in same vertical by grouping equivalent "sentences") can be determined.

As discussed herein, NLP can be generally described as multiple theory-driven computational techniques for the automatic analysis and representation of human language. NLP, referred to herein, may be processes that involve computers performing a wide range of natural language related tasks at various levels, such as parsing, and pattern recognition. Recent advancements in deep learning, for instance applying neural networks for dense vector representations, has further improved some NLP-based tasks. Closely related to this trend of deep learning within NLP is the concept of word embeddings. As described herein, word embeddings can be described as a vector representation (e.g., vector of numbers) of words which is capable of capturing the context of the words (in a document). Generally, word embedding techniques have been employed to understand word relationships in a document or "corpus." As referred to herein, corpus can be defined as a body of words or sentences, within a text or collection of texts. Accordingly, an advantage of embedding (e.g., distributional vectors) is its ability to capture similarity between words. Furthermore, measuring similarity between vectors is possible. Word embeddings, due to these characteristics, can be useful as a processing layer in a deep learning model.

For instance, word embedding techniques can ultimately capture network behavior, recognizing similarities and occurrences between interactions and thereby adding contextual worth to data that may otherwise be less meaningful in convention network security techniques. Further details regarding word embeddings and other semantic learning approaches are described in U.S. patent application Ser. No. 16/513522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety.

Word embeddings are described in reference to the above-mentioned NLP-driven network analytics approaches. However sentence embeddings can be particularly employed in the equivalent access sequences (EAS) techniques disclosed herein. Similar to word embeddings, sentence embeddings can embed semantical structures into a vector space, namely a full sentence (as opposed to a word). In natural language, sentences are typically comprised of a group of words, and similarly word embeddings often serve as the underlying foundation on which sentence embeddings can be built upon. Accordingly, sentence embeddings typically inherent many of the context-rich features that are characteristic of word embeddings. Vector representations through sentence embeddings can capture the semantic meaning of the text (similar to word embeddings, but encoded on the sentence-level). For instance, when using embeddings to represent words, some of the words with similar semantics (or contextual meaning) are typically in close proximity to each other in the word embeddings vector space. Extending this to sentence embeddings, similar sentences (i.e., texts which may use different words but have similar semantic meaning to human in natural language comprehension), can be captured through similar sentence embeddings. Due to the flexible and extensible nature of sentence embeddings, their use can be particularly effective for certain downstream NLP-driven tasks, including: computing a similarity matrix of sentences based on their embeddings; generating visualizations of embedded sentences using a common technique such as t-SNE; and predicting missing values (e.g., dimensions) for a sentence. Practically, sentence embeddings can be useful for tasks where preserving semantic and/or contextual equivalence (e.g., simple word meanings) is important. As an example of an existing real-world application, sentence embeddings are applied in understanding the quality of machine translations between different languages. Overall, sentence embeddings are emerging as a powerful construct for exploring semantic properties of language, and advancing the capabilities and applications of NLP-driven approaches.

Advantageously, various embodiments leverage the various deep learning properties of sentence embeddings in order to embed formulated network sentences. Even further, the embodiments can analyze these network sentence embeddings to determine an "equivalence" of access sequences. As referred to herein, "equivalence" may be commonalities with respect to the network activity, such as communication with the same server(s) or temporal similarities (e.g., every day at 9 am). Therefore, the construct of network sentence embeddings has been specifically developed to support NLP-based analysis of network data, as disclosed herein. Furthermore, techniques of analyzing the semantic properties (including measuring semantic equivalency) of access sequences that are represented via network sentence embeddings are also disclosed herein.

As a result, the disclosed embodiments apply the above-mentioned NLP-concepts to network data (e.g., logs, transaction records), in a manner that captures contextual meaning and "equivalency" with respect to network activity. For instance, referring back to the previous practical applications, the disclosed sentence embedding techniques can be broadly applied in a manner that allows NLP-driven analysis of network activity to be used to determine whether two accesses are similar. Although some existing text analysis systems currently use NLP approaches to extract valuable contextual insight from vast amounts of data, many network security mechanisms, such as network monitoring systems and intrusion detection software are not designed to implement concepts that are typically limited to the natural language space. Nonetheless, according to the embodiments, a system is designed to structure network data in a form that lends itself to be analyzed like natural language sentences. Subsequently, the system can glean insight from analyzing the semantics of network data in a manner that is unique and realizes improvements, such as improved accuracy, over current network security mechanisms.

Transaction records are data structures that include data related to interactions between entities within a network (e.g., Netflow records or Flow records with deep packet inspection information). For instance, text of a transaction record can be parsed to extract information linked to an interaction, such as which server within an enterprise is accessed by a particular user, by correlating with Active Directory or other Authorization logs, during a network communication. These transaction records can be subjected to text-based analysis, where the data included in each transaction record can be viewed as natural language words. Similarly, transaction records can be formulated into sentences, which are referred to herein as network sentences. Thus, collecting a vast amounts of data from multiple transactions over a period of time can build a "corpus" of the network activity which drives formulation of the embedding space. It should be appreciated that although network sentence embeddings are described with respect to transaction records for purposes of illustration, that the disclosed techniques are not limited to transaction records and can be applied to various other types of structures that contain relevant information usable to formulate the corpus, such as firewall logs.

Figure 2:
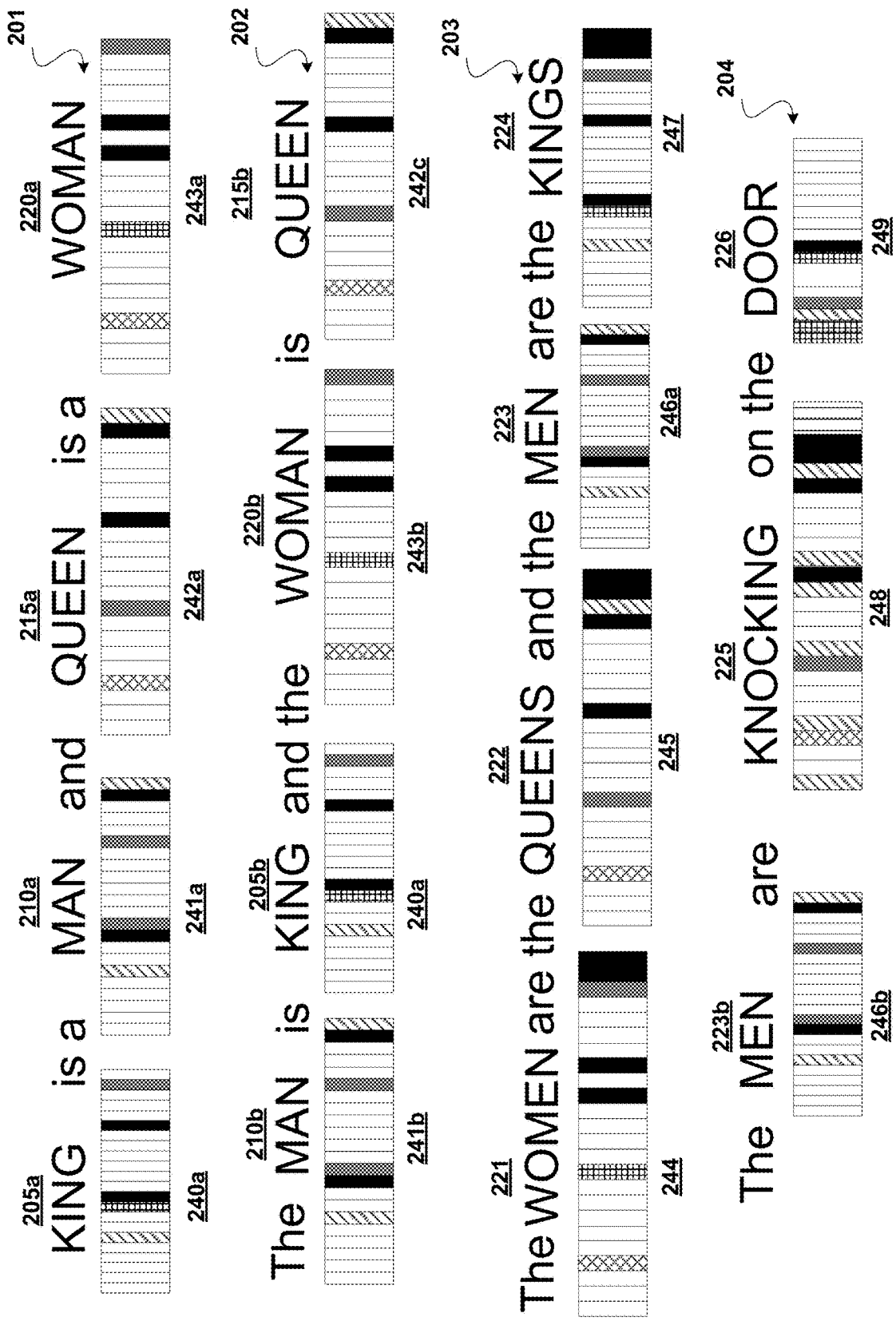
FIG. 2 is a conceptual diagram of examples of sentence embeddings, according to some embodiments.

Generally, sentence embeddings can be described as a semantic vector space representation of a sentence. A conceptual example of sentences embeddings, which can be sentences represented as a series of vectors, is illustrated in FIG. 2. In the illustrated example, multiple sentences 201, 202, 203, and 204 in a natural language may be received by a sentence embeddings model. A first sentence 201 is shown as "King is a man and queen is a woman." Another sentence, sentence 202 is shown to read, "The man is king and the woman is queen." Yet another sentence 203 is shows as "The women are the queens and the men are the kings." A last sentence 204 is shown to read, "The men are knocking on the door." Notably, sentences 201, 202, and 203 illustrate sentences that can be consider to have similar semantic meanings. In other words, each of the sentences 201, 202, and 203 may not be comprised of the exact same words, but have similarities (or an equivalency) with respect to the meaning of the sentence as a whole. For instance, sentence 202 can be considered as a rephrasing of the first sentence 201. Restated, sentence 202 primarily includes many of the same words used in sentence 201, but arranged in a different sequence. In addition, sentence 203 includes words that are different from the words included in sentence 201, but have substantially similar meanings. Generally, sentence 203 uses plurals of the principle words (e.g., nouns) included in sentence 201. Another example of sentences that may not include all of the same words, but have similar meanings semantically, are sentences constructed in the active voice or the passive voice. While the words in two sentences may not have exactly the same their meanings, these sentences can end up being closer semantically indicating that the context of the two sentences relate to the same subject and/or content. For instance, a sentence in the active voice may state, "Beautiful giraffes roam the Savannah." In the passive voice, the sentence can be structured as "The Savannah is roamed by beautiful giraffe." Although some words and the arrangement of the sentences are different in the active voice versus the passive voice, the sentences generally have the same meaning. Sentence embeddings are effective in capturing the semantic similarities, even in the presence of slight deviations. Sentence 204, in contrast to sentences 202, and 203 of the group in FIG. 2, illustrates a sentence that has a considerably different meaning than the first sentence, sentence 201.

As seen in FIG. 2, sentence embeddings can be formulated from various words in each of the sentences 201-204. It should be appreciated that FIG. 2 shows the sentences being represented as vectors of some of the words. In the illustrated example, words that have significance with respect to impacting the sentences' meaning (and ignoring articles such as "the") are represented as vectors. Particularly, the words "King" 205a, "Man" 210a, "Queen" 215a, and "Woman" 220a, from sentence 201 are represented as vectors. Similarly, FIG. 2 illustrates: in sentence 202 the words "King" 205b, "Man" 210b, "Queen" 215b, and "Woman" 220b, are represented as vectors; and in sentence 203 the words "Women" 221, "Queens" 222, "Men" 223, and "Kings" 224 are represented as vectors.

Sentence embeddings can be derived from the above-mentioned word embeddings, where the words are grouped together in a natural language sentence having meaning and context, such as in sentences 201, 202, and 203. Referring to the example of sentence 201, the words "King" 205a, "Man" 210a, "Queen" 215a, and "Woman" 220a occur together (within respect to a sentence) in a sequence, which can be considered a contextual relationship. Thus, based on NLP-driven analysis, a model can be trained to learn that the words "King" 205a "Man" 210a, "Queen" 215a, and "Woman" 220a have a semantic meaning and some level of contextual relationship due to natural language semantics and syntax.

Similarly, the above-mentioned words appear together in sentence 202, but arranged in another sequential order, namely "Man" 210b, "King" 205b, "Woman" 220b, and Queen" 215b. Also, as previously described, sentence 203 includes words that have a substantially similar sematic meaning to those in sentence 201. That is, sentence 203 refers to the same nouns of sentence 201, but in the plural, namely "Women" 221, "Queens" 222, "Men" 223, and "Kings" 224. Furthermore, vectors for each of these words can be determined, as previously described. FIG. 2 illustrates sentence 202 corresponding to a vector representation, shown as: "King" 205b being represented as vector 240b; "Man" 210b being represented as vector 241b; "Queen" 215b being represented as vector 242b; and "Woman" 220b being represented as vector 243b. Regarding sentence 203, it is has a vector representation shown as: "Women" 221 being represented as vector 224; "Queens" 222 being represented as vector 245; "Men" 223 being represented as vector 246; and "Kings" 224 being represented as vector 247. Accordingly, an NLP-driven sentence embeddings model can analyze the syntactic structure and semantic meanings of the sentences using the vector representations, for example by being trained on sentences 201, 202, and 203 (and additional sequences including these words, occurring in a number of sentences observed over a period of time). Often times, a sentence's semantic meaning is encoded in the generated sentence embeddings. Consequently, many sentence embeddings have the property of semantic localization in the model, where the meaning of a sentence coincides with their embedding's position in the vector space. As a result, sentence embeddings can capture semantic meaning of sentences, such that sentences with the same meaning also have an equivalency in the embeddings, being co-located (or a proximately located) in the vector space.

For instance, a model may be trained to derive that in many instances, the words "Man" 210a,b "King" 205a,b "Woman" 220b, and Queen" 215a, have contextual similarities, as they often appear in the same sentence. Also, the model can learn that the words "Women" 221, "Queens" 222, "Men", and "Kings" in sentence 203 have similar meaning to the words in sentences 201, 202 based on the corresponding vectors. As an example in the natural language context, it can be ascertained that a "King" 205a is also a "Man" 210a based on English definitions, thus the words have some similarity. Furthermore, the model can learn from the sentence embeddings, that sentences 201, 202, and 203 have similar meanings, for example due to recognizing the presence of the same words (or similar words). Moreover, as alluded to above, due to semantic localization in the sentence embeddings model, this equivalence can be captured in the vector space, where sentences 201, 202, 203 will be located close together. Accordingly, a model based on sentence embeddings can be trained to determine equivalency.

Referring again to the example in FIG. 2, after being trained on sentences 201 and 202, 203, the model can then encounter a sentence that may have a significantly different semantic meaning, illustrated as sentence 204. In the example, sentence 204 includes words having very different natural language definitions than the words in sentences 201, 202, and 203. Therefore, the vector representation of sentence 204 will also differ significantly. Sentence 204 reads "The men are knocking on the door." In this example, a sentence embeddings of sentence 204 may include: "Men" 223b represented as vector 246b; "knocking" 225 represented as vector 248, and "Door" 226 represented as vector 249. With the exception of the "Men" 223b, sentence 204 has no commonalities in semantic meaning or syntactic structure with sentences 201-203. Using NLP-driven techniques, the model can identify that sentence 204 is not equivalent to sentence 201, signifying that sentence 204 has a different natural language meaning than sentence 201. For example, sentence 204 may be embedded at a position that is relatively far away from sentence 201 (as compared to sentences 202, 203) in the vector space. Thus, leveraging sentence embeddings to encode a number of factors relating to network sentences like a natural language sentence, including capturing semantic meaning, allows equivalency and patterns to be readily recognized in network activity.

In the absence of embeddings, each word would be represented by one-hot encoding that places each word in their own ortho-normal space without any relations. Alternatively, with embeddings as representation of the words in a continuous relational space, the models can be made more accurate and also made faster to train due to the reduction in the dimensionality required to represent the words (as compared to one-hot encoding). The disclosed techniques extend the practical application even further, utilizing systems and techniques that can adapt NLP approaches to be effective in network security.

For example, in the realm of computer networking, a "sentence" can be considered a network interaction that is captured for analysis by their corresponding transaction records. A "sentence" of servers can include several servers in related interactions that may be grouped together, for instance by the users accessing them. As such, another capability of the word embeddings techniques include the flexibility to generate, or craft, a corpus that is customized to the particular entities to be captured in a unified embedding space. For example, in order to create an embedding space to capture sever groups, a corpus can be crafted which specifically include sequences of servers grouped for a particular user. As another example, to achieve an embedding space of users with common workflow along temporal proximity (e.g., within the same day), the corpus can be crafted to include sequences of users for a particular server. Consequently, the disclosed "crafted corpus" features can allow for flexibility in the embeddings approach, allowing the techniques to be highly adaptable for a specific application and/or to be modified for continued use across multiple varying networks. As an example, two retail shops, such as restaurants, can have similar network assets. Thus, the type of transactions in the network may be similar, for instance using Point of Sale (POS) machines, employing handheld tablets (e.g., for taking orders), and cameras (e.g., surveillance on the premises). These network assets can have different IP addresses and hostnames in different locations. Such equivalence could be extended between two shops from different vendors in the same or different location. Equivalence could be determined with a crafted corpus of sequence of assets accessed, grouped per user (whose names could be different) with data from both the restaurants.

The disclosed embodiments also generate embeddings models based on sentence embeddings techniques. As alluded to above, sentence embeddings can be used to build a vector representation of transaction records with crafted sequence formulations (e.g., network activity sentences). As described herein, applying sentence embedding techniques to network transactions are referred to as "network sentence embeddings." Then, in a manner similar to measuring vectors to capture relationships between natural language sentences, network sentence embeddings (that include vectors of transaction records) can be used to establish equivalence in access sequences (indicating common trends in network activity). For instance, users having an access sequence involving the same server(s) can be characterized as equivalent, in the same way that sentences including similar words tend to have "equivalent" meanings.

Furthermore, training an embeddings modeling, generated from learned network activity sentences over some time period can be effective in developing contextual similarities in network activities. An embeddings model generated from a crafted corpus of transactions records can be described as a "network embeddings model." As an example, a network embeddings model representing the access patterns of a particular user in the network at the same time of a day, can be analyzed to determine whether an interaction can be considered within the context of a user's learned network behavior. Alternatively, embedding models can be used to recognize when an interaction in out-of-context, which may be indicative of an anomaly. In the embodiments, embedding models are used as a building block in the DNN (where the embedding layer can be trained outside the model in an unsupervised way) framework, which can be used to identify trends in network activity and detecting anomalous activity. Moreover, due to smaller dimensionality associated with embeddings models, their use in network analysis can provide the added benefits of fast and efficient computation of NLP tasks, thereby reducing the impact on the overall efficiency of running analytics.

Although the system and techniques are described in reference to word embeddings, it should be appreciated that other types of embedding approaches that are applicable to NLP-based analysis, such as character embeddings, sentence embeddings, and contextual embeddings, can be applied in lieu of, or in addition to, word embeddings techniques discloses herein. For example, sentence embedding can be used to capture the semantics of the sequence of access among network entities. Accordingly, sentence embedding can build from the use of words embedding (which focus on an individual network entity), where the sentence embeddings provide an understanding of the semantics of the sequences themselves. In other words, the sequence of the entities accessed can build non-contextual individual entity embeddings.

Furthermore, embodiments can extend the use of word embedding techniques into various network security applications. The disclosed system and techniques can include a graphical user interface (GUI) which further provides a visualization of the network (e.g., network entities), as derived from analysis of word embedding models. In an example, a network visualization can display visual represents of an embedding space. A user interacting with the GUI, for instance a network administrator, can visually compare the displayed embedding space against their understanding. As word embeddings can capture the network's activity over time, a visualization of the network modeled using these word embeddings can show network interactions in a manner that provides a user-friendly and easily recognizable indication of anomalies (e.g., outlier in the embedding space). Additionally, in some embodiments, the above-mentioned visualization can be used to display anomalous access patterns based on the word embedding techniques. Further, the visualization can have additional interactive features, such as filtering out some outliers that may be within a safe buffer (e.g., temporary access granted to a user), thereby mitigating false positives and improving accuracy of the network security functions. As a general description, systems and techniques disclosed herein can implement various interactive features pertaining to network analytics, such as network visualization, clustering, network monitoring, access pattern analysis, and network anomaly detection. Thus, the embodiments allows a user to interact with and configure aspects of the NLP-based network analytics, namely the word embeddings techniques.

Moreover, network analytics driven by the word embeddings techniques can provide validation of the network coverage or lack thereof. When embedding relations indicate a violation of expected network behavior (e.g., network administrators determine rules or behavior observations), the root cause can either result from problems relating to data collection or a real behavioral understanding gap from the real world. Validation through word embeddings can lead to disambiguation in this regard. Also, the validation of the data collection can be provided through word embeddings. Drastic changes in embedding definition of network entities can mean that a significant change in the network has occurred, or that anomalous behavior has transpired in the network. In an example, an embedding space of entities that include applications and their servers after a service rollout or a migration of service from one resource to another can be analyzed in accordance with the techniques described herein.

Referring now to FIG. 1, an example of a system 100 distributed across a communications network 110 and including a network device, shown as analyzer 140 for implementing the disclosed network embedding techniques is illustrated. The analyzer 140 can be configured for implementing various NLP-driven techniques (e.g., semantic learning, word embeddings, etc.)for enhanced network analytics, according to some embodiments. In some embodiments, the analyzer 140 can be a centralized computer, such as a server, having a processing capacity that is suitable to support the data processing and analysis necessary to implement the network embeddings features disclosed herein. Details describing the function and capabilities of the analyzer 140 are further described throughout.

In FIG. 1, an example network architecture includes clients devices 110A-110N, servers 160A-160N, and packet processor 130 that can be proximately located, for instance within the same customer premises. Additionally, the client devices 110A-110N, servers 160A-160N, and the packet processor 130 can be communicatively connected to each other as part of a local area network (LAN) 101 (indicated by dashed lines). LAN 101 may be installed at the customer premises, such as in retail a store, a business (e.g., restaurants, shopping malls, and the like), a factory, an office building, and the like. In that regard, LAN 101 may include one or more of the clients devices 110A-110N.

Client devices 110A-110N may include a desktop, a laptop, or a mobile device such as a smart phone, a tablet, or any other portable computing device capable to communicate through LAN 101. In that regard, for example, client device 110A may include several types of devices, which, even in the case that client device 110A is mobile, may be loosely or less often associated or co-located with a user. Another type of client device 110B, for instance, may be more often or almost always associated or co-located with a user (e.g., a smart phone or another wearable device). As illustrated, the plurality of client devices 110A-110N can attempt to communicate with, or otherwise access the servers 160A-160N on LAN 101. In the illustrated example, servers 160A-160N include hardware and software to provide data and/or services for consumption by client devices 110A-110N. For example, a server 160A can include a web-based application that handles and delivers e-mail over a network, typically over the Internet. Thus, certain client devices, for instance client device 110A, may be used by an employee that connects to server 160A for communicating via e-mail. Another server, such as server 160B, can act as a finance server for a business, and thus can provide certain financial applications (e.g., sales portals) and financial documents. In some cases, access to a finance server 160B may be limited to certain client devices on the LAN 101, for example devices that belong to those employees in the financial department. An employee within the financial department may have permission to financial aspects of the business, such as accounting personnel. Accordingly, a client device 110B, used by an accountant, may access server 160B in order to perform financially based tasks. Alternatively, client device 110A may not have a need for (or may be restricted from having authorization) accessing server 160B.

Continuing with the example, another server on LAN 101, such as server 160C, can provide another distinct service. Server 160C, for instance, can be a code repository server that supports multi-developer projects by hosting source code (e.g., allowing developers to submit and/or access patches of code). As such, client devices that may be used by software engineering employees of a business, as an example client device 110C, may access the server 160C in order to perform various software development tasks. In an example of another network architecture, LAN 101 can include multiple subnets that are assigned to each of the various departments described above. Thus, the network activity for a respective client, such as client device 110A can be characterized interacting with other network entities within its respective subnet.

In some scenarios, the client device 110C may access one or more additional servers, alongside of accessing code repository server 160C that may be assigned to an engineering department. The additional servers may provide services that are related to coding, for example, and can be used while the client device 110C is being used for working on software development projects. In an example, server 160D can act as a bug repository that keeps track of reported software bugs in software development projects. Accordingly, in some cases, client device 110C being utilized by a software engineer may access both server 160C and server 160D concurrently.

Each of the above-mentioned examples can be generally described as exemplifying departmental workflows, or access trends of client devices 110A-110N with respect to the network resources within LAN 101 that may be assigned to their respective departments. That is, there can be access patterns established by the typical workflow of an employee within a department, for example. As described above, clients devices 110A-110N used by employees in a particular department, such as the financial department, engineering department, and the like can often times have similarly reoccurring network activity. For example, each employee may have a specific workflow involving repeated network activities. Even further, multiple employees may share similarities in their workflow on the departmental level, where employees in the same department have commonly shared network activities. Network activity with respect to these departmental workflows (or employee workflows) can also translate to transactions records that have identifiable similarities, such as similar source/destination pairs, repeated times and/or frequency of access, and other attributes relating to interactions between entities on the LAN 101. Over time, analyzing network activity, such as interactions relating to departmental workflows, can be indicative of trends that can be considered normal in the network. Patterns involving which client devices 110A-110N access which servers 160A-160N within the network can be identified, analyzed, and modeled. As an example, it may be observed that as a software engineer, the user of client device 110C (e.g., USER C) often times has the workflow of accessing e-mail server 160A Monday-Friday between 9:00 am-9:30 am (e.g., responding to emails at the start of the work day). Then, during a typical workday, for instance Monday-Friday between 10:00 am-4:30 pm, the user of client device 110C is usually working on a software development project that involves accessing the code repository on server 160C, which is often followed by accessing the bug repository on server 160D. Afterwards, before leaving the office at the end of the work day, the user of client device 110C typically responds to all of his emails, and again accesses e-mail server 160A Monday-Friday between 9:00 am-9:30 am (e.g., responding to emails at the start of the work day). Accordingly, an example of a sequence of accesses that is characteristic of routine network activity for client device 110C (e.g., USER C) can be: server 160A, server 160C, server 160D, server 160A.

Similarly, another user in the enterprise may also work in the software engineering department. For example, a user of client device 110D (e.g., USER D) may also be a software engineer. As a result, clients devices 110C and 110D may be associated with the same departmental subnet for software engineering. Furthermore, as software engineers, the user of client device 110D may have similar duties, and correspondingly a similar departmental workflow to the user of client device 110C. For example, user of client device 110D (e.g., USER D) may access the code repository on server 160D, followed by the bug repository on server 160D during a work week, such as Monday-Friday between 9:00 am-5:30 pm. Lastly, the user of client device 110D (e.g., USER D) may check emails at the end of the day, typically accessing the email server 160A Monday-Friday between 5:30-6:00 PM. Thus, user of client device 110D (e.g., USER D) can have a sequence of accesses that includes: server 160C, server 160D, server 160A. It should be appreciated in this example, that the user of client device 110C may frequently have sequence of accesses that is similar to the sequence of accesses of user of client device 110D. In contrast, the sequence of access for the user of client device 110C (and the user of client device 110D) may be very different from a user having a completely different departmental workflow. For instance, these sequences of access may diverge from client device 110B, used by an accountant, having typical network activity that involves access server 160B in order to perform financially based tasks.

Moreover, it may be an impractical approach to analyze or label all possible sequences of all combinations of accesses to the servers 160A-160N within the enterprise that may occur. However, by implementing the disclosed sentence embedding embodiments, the analyzer 140 can formulate a corpus of network sentences that include access sequences of resources within the enterprise. Then, the analyzer 140 can apply NLP-based sematic measures to an embeddings space of the network sentences to identify "equivalency" between sequences, in a manner that can be useful for network security applications.

As illustrated in FIG. 1, the packet processor 130 can passively collect and analyze the traffic in a network, such as LAN 101. In the example of FIG. 1, the packet processor 130 can collect packets 120A-120N that are transmitted from and/or received by clients 110A-110 in accessing servers 160A-160N during an employee's normal workflow. In some cases, packet process 130 can collect other forms of intent to access messages including information relating to network interactions, such as discovery protocol messages as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. Accordingly, these collected packets 120A-120N can be used to compile a log of transaction records (e.g., conversations) 143 at an analyzer 140. The transaction records 143 can then be analyzed using the NLP-based techniques disclosed herein. Transactions records 143 can include information communicated in accordance with one or more network discovery protocols, such as dynamic host configuration protocol (DHCP), a domain name service (DNS), a multicast DNS (mDNS) protocol, a link layer discovery (LLDP) protocol, a CISCO discovery protocol (CDP) that include information content about the network. Also, transaction records can include information in accordance with network protocols, such as transmission control protocol (TCP). It should be appreciated that other types of protocols and information that allows devices to operate in the network can be collected and analyzed using the techniques disclosed herein. An example of a log comprised of transaction records 143 that can be used by analyzer 140 is shown in FIG. 3.

Also, FIG. 1 serves to illustrate that the analyzer 140 includes a network embeddings module 141. The network embeddings module 141 can program the analyzer 140 to execute various functions that allow the analyzer 140 to implement network sentence embeddings for network analysis, in accordance with the NLP-driven techniques described herein. Furthermore, according to various embodiments, the network embeddings module 141 and components described herein may be implemented in hardware and/or software that configure hardware.

The network embeddings module 141 can be configured to create a crafted corpus, illustrated as corpus 142, from data indicative of network activity, such as the data included in transaction records 143. In NLP, a corpus can be defined as a body of words or sentences. In a similar manner, the analyzer 140 can generate a corpus 142, or sequence of "sentences" that forms the semantics used in network-based communication between entities on LAN 101. As an example, the analyzer 140 may be configured to analyze the network activity of a particular user whom accesses assets on LAN 101, for instance client device 110A. The analyzer 140 can perform NLP-driven analysis on data, from transaction records 143 for example, that is specific to the network activity that involves client device 110A. In some embodiments, the network embeddings module 141 can generate a "crafted" corpus 142, as previously described. In continuing with the above example, the network embeddings module 141 can particularly structure a crafted corpus 142 in order to capture network activity of client device 110A in an network embeddings space. Thus, in a scenario, a corpus 142 formulated by the network embeddings module 141 can include sequences of servers in LAN 101 that client device 110A interacted with during a single session, for instance.

Figure 4:
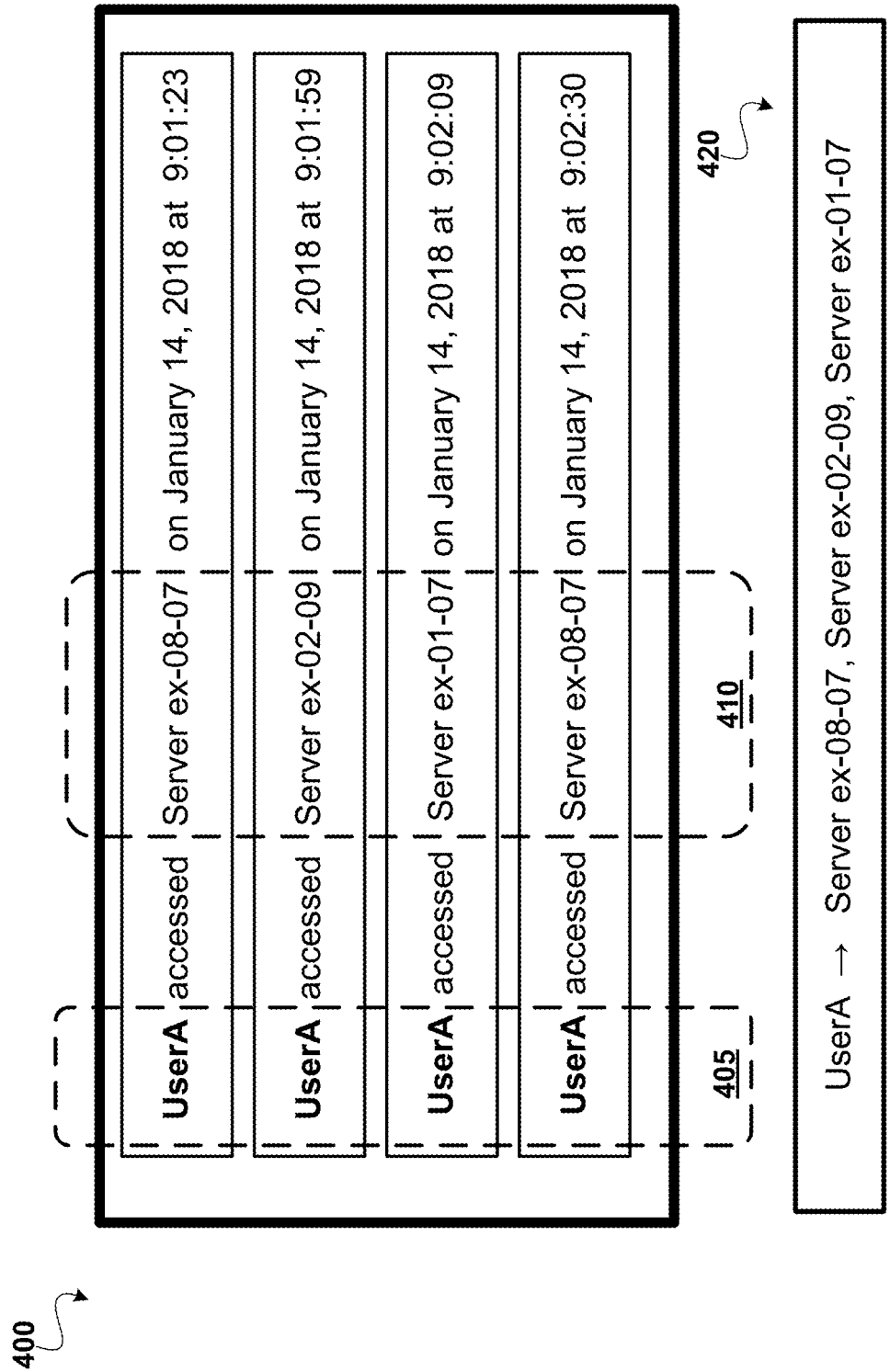
FIG. 4 illustrates an example of a crafted corpus for capturing a sequence of servers in a network embedding space using data from the transactions log shown in FIG. 3, according to some embodiments.

A key concept with respect to particularly crafting a corpus 142 is that the formulation of the corpus can be based on the use-cases to be analyzed. Thus, by crafting the corpus, there is control over the representation in the embedding space. For instance, a corpus can be crafted so that the corresponding embedding space is a representation of the resources in the network, or so that the embedding space represents a particular user. As described herein, a network embedding module 141 can formulate a crafted corpus 142 that is structured in accordance with one of three principal categories, including: 1) a crafted corpus of servers, per user (e.g., per session); 2) a crafted corpus of users, per server (e.g., per day); and 3) a crafted corpus of a group of users, per group of servers accessed. As an example, a crafted encoded corpus may be formulated to include a sentence "user A accessed Server B", which can yield a merged space, where cohesiveness across the groups of servers and the groups of users can be represented. Additionally, sentences like "user A accessed server B" can be augmented to include DPI information to formulate more comprehensive sentences that describe the action. For example, an augmented sentence can be formulated as "User A "git synched" (app and operation metadata) File by name "n" of <significant>size from the code repository by name "server b." Establishing equivalence of sentences of this sorts could get out of hand quickly just based on entity embeddings for various entities. Leveraging sentence embedding techniques in NLP maps to this corpus pretty logically Although the aforementioned categories are described in detail for purposes of illustration, it should be appreciated that the network embeddings techniques can adapt a crafted corpus in a manner that does not fall under these categories. As such, a crafted corpus can be structed to represent any network entity (also referred to herein as network asset) or other data relating to network activity as deemed necessary and/or appropriate for a certain network security application. Examples of crafted corpuses structured in the group of user category is illustrated in FIG. 4, and are discussed in greater detail below. In some instances, a crafted corpus can include data related to communication networks such as hostnames, protocol information (e.g., TCP), ports, IP address, MAC addresses, remote addresses, authentication information, activity description, timestamps, ping times, client devices, network users, network asset state information, log files, HTTP code, pages requested, user agents, referrers, bytes served, errors, active directory logs, proxy logs, etc.

Furthermore, by executing the network embeddings module 141, the analyzer 140 can use the crafted corpus 142 to generate an embedding space of network sentences (also reference to herein as network sentence embedding). Using various techniques of NLP, the network embeddings module 141 can be trained to learn the semantics of these network sentences from the generated network embeddings. The recognized semantics can then be used to measure equivalence of semantics between network sentences. That is, network sentences having equivalent semantics based on the network sentence embeddings, may be further considered to have similar "meanings." Accordingly, if the network embeddings module 141 measures the semantics of two network sentences and determines that they are equivalent, their corresponding access sequences are also deemed to be equivalent. In some instances, with respect to natural language, two sentences may be semantically equivalent (having similar meaning) even when all of the words in the two sentences are not exactly the same. This concept extends to another practical application of the disclosed sentence embeddings techniques, where the analyzer 140 can determine semantic equivalence of access sequences across different enterprise network, although the particular resources (e.g., words) that are accessed within each of the enterprise networks may be different. According to the embodiments, the analyzer 140 is configured to determine semantically equivalent sequences of accesses using proximity measures in the embeddings space of the network sentences. Also, the network embeddings module 141 can have the capability of label propagation. Label propagation techniques can be used to propagate labeled access (e.g., valid or illegal) to network sentences that are determined to be semantically equivalent.

As an example, the network sentence embeddings model 144 can embed network sentences (comprised of access sequences) corresponding to the user of client device 110C (USER C). Then, as illustrated in FIG. 1, the analyzer 140 can analyze the embedding space from the network sentence embeddings model(s) 144 to perform proximity measures of the network sentences (within the embedding space). Measuring the proximity of two network sentences in the embedding space can correspond to measuring their semantic equivalence, as previously described. Ultimately, by measuring proximity, the analyzer 140 can find the aces sequences that are semantically equivalent for that user. For example, the network embeddings module 141 can generate a network embedding that represents a number of times that a server is found near other (potentially proximate) server with respect to the network activity of a particular user. Network embeddings are discussed in greater detail in reference to FIG. 4.

Semantic localization of sentence embeddings, described in detail above in reference to FIG. 2, suggests that the "meaning" of a sentence coincides with their embedding's position in the vector space. Thus, network sentence embeddings can capture the semantic equivalency of network sentences having similar "meanings", being represented in the embeddings space by their proximity. In other words, network sentences that are measured to have high proximity, for instance being co-located (or a proximately located) in the embeddings space, also identified as having semantically equivalent access sequences. Referring back to the examples of network activity for the user of client device 110C (e.g., USER C) and the user of client device 110D (USER C), their respective network sentences may be proximate to each other in the emending space (with respect to an embedding space of the entire enterprise), representing a measure of equivalency in their sequences of network accesses.

Also, FIG. 1 shows that the analyzer 140 can include network sentence embeddings model(s) 144. Typically, network sentence embedding model(s) 144 are a result of NLP-driven analysis of a crafted corpus 142. Network sentence embeddings model(s) 144 may be implemented as a vector space model that represents (e.g., embeds) network sentences in a continuous vector space. Consequently, semantically similar, also referred to as "equivalent", network sentences can be mapped to nearby points (e.g., embedded nearby each other) within the network sentence embeddings model(s) 144. Network sentence embeddings model(s) 144 may depend on the distributional hypothesis, as alluded to above, which posits that network entities that appear in the same, or similar, contexts are related.

Additionally, FIG. 1 shows a client 150 including a network security interface 151. The client 150 may be a client device having network analysis applications, including the network security interface 151, that consumes the analytical data processed by analyzer 140. As an example, the client 150 can be a desktop, a laptop, or a mobile device such as a smart phone, a tablet, or any other portable computing device that can be used by a network administrator for monitoring a network, such as LAN 101. In some instances, the client 150 and the analyzer 140 are communicatively connected via a network (not shown) allowing communication of data between the devices. In the embodiments, the network security interface 151 includes executable instructions, computer components, or a combination of both that implement a visualization of the network sentence embeddings. An example of a visualization of sentence network embeddings model(s) 144 is shown in FIG. 1 as output of a network security interface 152. As previously described, the network embeddings model(s) 144 can be a vector space of network sentences having distances, or a proximity, that may be measured between them as an indication of semantically equivalent accesses. In other words, a visualization of the network embeddings model(s) 144 can include a visualization of the representations of access sequences that are grouped together, or displayed as proximate to each other, based on sharing similar semantics or "meaning." For instance, the access sequences of client device 110C and client device 110D having, where the users typically have a common workflow from being employees in the engineering department (e.g., accessing the same servers, printers, etc.), may be deemed semantically similar in the network embeddings model(s) 144, and therefore may be mapped nearby to one another (forming a group) in the visualization (forming a group that has a greater distance from client devices in other departments). Similarly, access sequences that are frequently observed for client device 110C, such as sequence of: server 160A, server 160C, server 160D, and server 160A may be mapped in close proximity to each other in the visualization.

The network security interface 151 can be an application the utilizes network sentence embeddings and the established equivalency of access sequences for network security applications. Network security interface 151 can include executable instructions, computer components, or a combination of both that implement various network security related capabilities, including presenting visual, graphic, or image components relating to predictions of network activity generated by analyzer 140. The network security interface 151 translating the network embeddings model in a multidimensional space into the visualization generated in a reduced space (e.g., two-dimensional or three-dimensional space)using a NLP-driven visualization techniques as described in detail in U.S. patent application Ser. No. 16/513522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety. In most cases, visualization of the network embeddings can be performed without loss of information during the dimensionality reduction by using the techniques similar to t-Distributed Stochastic Embedding (t-SNE). In the example, the network security interface 152 can display the graph shown in FIG. 1 as a result of analyzer 140 performing network sentence embeddings on interactions between the network entities on LAN 101, in accordance with the embodiments. In some cases, visual cues can be displayed for identifying network entities, such as servers, network activity and traffic in networks. Furthermore, a user can interact with the network security interface 152 to allow the visualization to be generated in an interactive manner. For instance, the visualization interface 152 can receive input from a user (e.g., select a simple outlier) that modifies to the visualization.

FIG. 1 illustrates an example of a network security application for semantic equivalency that can be implemented by the network security interface 151. As shown, the network security interface 151 can take the result of which access sequences have been identified as equivalent for a particular user, and compare that against that access sequences that is actively being monitored for that same user. For instance, in response to monitoring network activity of "User C" within LAN 101 using the disclosed access sequence equivalency techniques, it may be determined that there is a deviation between that sequence of servers accessed by "User C" while being actively monitored by the system 100, and the known servers corresponding to the equivalent access sequences for "User C" (as determined based on the access sequence). Referring back to the departmental workflow example, it may be identified that a monitored network interaction for "User C" on a Monday has a sequence of accessing financial server 160B, email server 160A, and then bug repository server 160D. However, "User C" the typically access sequences include server 160A, server 160C, 160D, 160 A. This may be represented in the visualization, where the monitored access sequence is placed being a large distance away (indicating no equivalence) from the group of equivalent access sequences for "USER C" in the embedding space. In this scenario, the network security interface 151 may display an alert window (or another type of indication deemed appropriate) that a "potential security event" has occurred on the network, based on the observed deviation between the and monitored access sequences and the equivalent access sequences. As described, system 100 can apply access sequence equivalency in order to provide insight on trends in network interactions represented in an embedding space, which in turn provides context-rich information for purposes of network security. For instance, with finding semantically equivalent access sequences, the system 100 can enhance its capabilities for determining anomalous activity, by first establishing access sequences that are equivalent which infers the common activity for the same user (or different users).

In some embodiments, the analyzer 140 also includes various capabilities related to network security, such as monitoring network activity. By applying the disclosed network embeddings techniques to effectively group like entities in a network (based on contextual similarities), system 100 addresses challenges that can arise in developing network security systems (e.g., distinguishing between members of a particular group or set, considering authorization and/or permissions in certain network interactions, and the like). As a result of using NLP-driven for the visualization, the visualization interface 152 can graphically represent a continuous vector space where network activity that is normal for a group is visualized with respect to position in the vector space (e.g., smaller distance), and alternatively network activity that is anomalous, or out of context for a given group (e.g., substantially large distance)

can be graphically presented by visualization interface 152. Furthermore, groups tagged by the visualization of the embeddings can be used to augment the crafting of corpus as to use the group names tagged for a bunch of co-located entities like department x, finance server. This goes back to the humanization of the process that captures tribal knowledge in admin to further map the semantics pretty close. For normalizing and identifying similar networks, a common vocabulary to mark the groups in a market segment (vertical) like "Point of Sale systems and similar names" in retail vs "code repository and other similar common asset names for tech enterprises". Now the corpus generated across vendors can start correlating pretty close with the normalization of the corpus.

In some embodiments, the system 100 can perform interactive device clustering using hierarchical distance as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. For example, the visualization interface 152 may present a graph which represents client devices 110A-110N on LAN 101 that are measured as having small distances from each other, as determined by the distance algorithm, as a cluster of nodes. Alternatively, the graph displayed within visualization interface 152 can show client devices 110A-110N on LAN 101 that are measured as having large distances from each other, as determined by the distance algorithm, as individual nodes separated by edges (having a length that is commensurate with the calculated distance).

Referring now to FIG. 3, an example of a transactions log 300 is shown. As seen in FIG. 3, the transaction log 300 can include multiple records of servers accessed within a communications network. A corpus may be generated from the transactions log 300, in accordance with the network embeddings techniques disclosed herein. As previously described, a corpus can be crafted to include formulated text or sequences based on the semantics intended to be captured. In some embodiments, generating a corpus (e.g., crafted corpus) includes tags, headings (e.g., column headings in spreadsheets), column names (e.g., from databases), and the like, as information to extract useful semantics. Furthermore, the tags of a corpus can be leveraged to formulate coherent sentences that binds various columns with right link words.

In the example shown, transactions log 300 includes several entries 303, where each entry is a record of a transaction (e.g., activity within a computer network). As shown, transactions log 300 includes lists of data 302a-302d that are organized into several different categories, including: "ServerName" 350; "DatabaseName" 351; "LogsGenerated" 352; "DurationInSeconds" 353; "Usernames" 354; and "TimeStamp" 355. Data 302a-302d, for example, contained in the transactions log 300 can be used to create a crafted corpus, as will be explained in more detail below. In the illustrated example, the transactions log 300 includes a list of network assets, shown as "ServerName" 350. The "ServerName" 350 category be a list of servers which have been requested to perform tasks in a certain network. Also, transactions log 300 is shown to include a list of database names, shown as "DatabaseName" 351. The "DatabaseName" 351 category can include a list of databases that are accessed by users, where the particular users are listed under "UserNames" 354. Remaining categories shown include "LogGenerated" 352 listing the number of logs generated, the "DurationInSeconds" 353 which lists a duration of a session (in seconds) when the servers were accessed, and "TimeStamp" 355 listing the timestamps for each entry.

Subsequently, the network embeddings techniques disclosed herein can extract network activity data from available sources, such as data 302a-302d from transactions log 300, in order to generate a crafted corpus. In an example, a user associated with user name "User A" may be an employee in the finances department, and accesses a server "ex-08-07" that is assigned to a subset of the financial department, while working on January 14 at 9:01:23 AM. Accordingly, entry 303 is an example of a record in the transaction log 300 that may be generated based on that network activity associated with "User A." The entry 303 lists the user, the server accessed by the user, the duration, and time stamp that is associated with that interaction. In some instances, the entry 303 (i.e., "User A" accesses server "ex-08-07") may reflect the type of network activity that is typical behavior in the context of "User A." Accordingly, an analyzer (shown in FIG. 1) implementing network embeddings techniques can formulate a type of crafted corpus that ties a user with a sequence of servers that each user accessed.

As previously described, a corpus of "words" from "sentences" relating to network activity can be particularly crafted based on the entities intended to be captured in a unified embeddings space. In FIG. 4, an examples of crafted corpuses that may be generated using the network embeddings techniques are illustrated. FIG. 4 shows an example of a crafted corpus 400 of sequences of servers 410 that are grouped for a particular user. As previously described, the disclosed network embeddings techniques can be used to generate a "server sequence" category of crafted corpus which specifically captures a sequence of server interactions that are grouped per user, per session. In the example, the crafted corpus 400 is structured for capturing server interactions involving "UserA" 405. As seen, the crafted corpus 400 includes a sequence of servers 410 that have been determined to be accessed by "UserA" 405 (based on NLP-driven analysis of transactions record shown in FIG. 3). The sequence of servers 410 grouped to "UserA" 405 in the crafted corpus 400 includes servers named "Server ex-08-07", "Server ex-02-09", and "Server ex-10-07." FIG. 4 also illustrates an example of a semantic relationship 420 that can be understood from network embeddings derived from the crafted corpus 400, which can be analogous to word embedding derived from semantics of a sentence in natural language. The semantic relationship 200 groups interactions with servers "Server ex-08-07", "Server ex-02-09", and "Server ex-10-07"to the network activity of "UserA."

Referring back to the example discussed in reference to FIG. 1, "UserA" 405 may operate a computer assigned to the financial department, and the servers in sequence 410 ("Server ex-08-07", "Server ex-02-09", and "Server ex-10-07) may be within the subnet utilized by the financial department to specifically support financial applications. In capturing the sequence of servers 410 that have been accessed by "UserA" 405 in the crafted corpus 400, and modeling this over time, the embeddings space may represent a sequence of servers that "UserA" 405 typically interacts with during his (or her) normal activity in the context of the financial departmental workflow. As an example of a visualization, the crafted corpus 400 may yield an embeddings space that represents network activity for "UserA" 405 in a multidimensional space that is then visualized in a reduce dimensional space, like a 2D or 3D space (using various techniques that are standard for embedding visualization in NLP). Based on the relation represented in the visualization, cohesiveness (or contextual relationships) between network entities can be presented visually. For instance, a network embedding relating to the example can be visualized where the sequence of servers 410 are grouped together in closed proximity, indicating that these servers are common interactions with respect to the specific user, namely "UserA" 405. Consequently, the network embeddings techniques can use crafted corpus 400 in a manner that allows a network security application to discern between interactions with certain servers that are contextually similar with respect to a user, or interactions with servers that may be dissimilar, or anomalous, for a user as captured in the unified embedding space.

Figure 5:
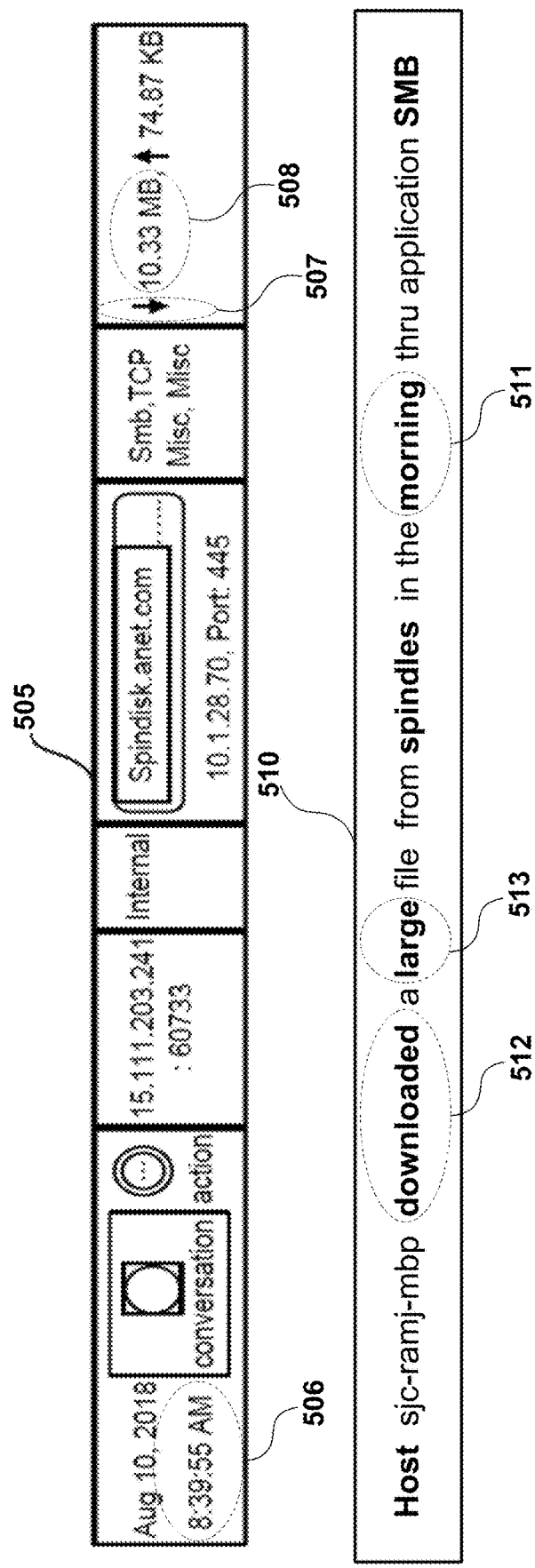
FIGS. 5 is an example of a network sentence generated using data from the transactions log shown in FIG. 3, according to some embodiments.

In addition to the crafted corpus 400, the access sequence equivalency techniques can use transaction records (or flow records) that are expressed in natural language, also referred to as network sentences. The example in FIG. 5 shows a network interaction in the form of a flow record 505 that has been regularized, representing data from the record in a network sentence, using words that having meaning to express certain parameters, thereby providing language context to the network interaction. In the illustrated example, the network sentence 510 includes "Hose sjc-ramj-mbp downloaded a large file from spindles in the morning thru application SMB." Generally, regularization provides improvements to NLP-driven techniques by reducing cardinality and capturing more of the human factors (summarization). In some sense, regularization can also be considered as reducing cardinality of the features themselves.

As an example of expressing record data as a natural language "word" in a network sentence, a time element 506 in the flow record 505 is highlighted (circled using dashed lines). The time element 515 in the flow record 505 is indicative of time related to the interaction, shown as "8:39:55 AM." In the network sentence 510, this element is encoded in human terms (natural language), shown as word 520 "morning" (circled using dashed lines). In this example, the network sentence 510 has been regularized to expresses the time element 515 in a manner that gives additional context and meaning to the interaction. In other words, a human can interpret the network sentence 510, easily recognizing its temporal-context suggesting that the interaction occurred in the morning. The context involves taking into account the time zones and human interpretation of the range of time within a day considered morning, evening and mid-day. Also, context may take into account any cultural or regional variations relating to interactions, such as using words that have a cultural context to describe when users get on, or leave, a network. Generally, encoded terms that can be used for expressing a time element 515 in a network sentence, such as network sentence 410, are descriptively representative of a time of day for a language, such as "morning", "evening", and the like. As another example, the flow record 405 includes a transfer (direction) element 507, which indicates a particular type of data transfer associated with the interaction, such as download or upload. In the illustrated example, the transfer element 507 in flow record 505 is a down arrow, which signifies that the interaction involved downloading of a data. The transfer element 507 in encoded in a natural language within sentence 510 as word 512 "downloaded". Also, the flow record 405 includes size (file) element 508, which indicates the size of the data that is transferred during the interaction. In the illustrated example, the size element 508 in flow record 505 is "10.33 MB", indicating the size of the downloaded the file(s). The size element 508 in encoded in a natural language within sentence 510 as word 513 "large". It should be appreciated that a network sentences, such as network sentence 510, can utilize other types of descriptive terms that can provide contextual value to an interaction, as deemed appropriate. As an example, the terms used can be a configurable feature of the disclosed access sequence equivalence techniques, allowing a user, such as network administrator to set the terms used for the encoding as appropriate for a particular application (e.g., broader terms that can capture neighboring time ranges without explicit configuration). Example of natural language terms that may be used for the encoding include, but are not limited to: time of day (e.g., "Morning", "Afternoon", etc.); a transfer (e.g., "upload", "download", etc.); and a size ("large", "small", etc.). Moreover, one or more different regularization methods may be applied to log records and/or flow records in order create regularized network sentences, as disclosed herein.

Figure 6:
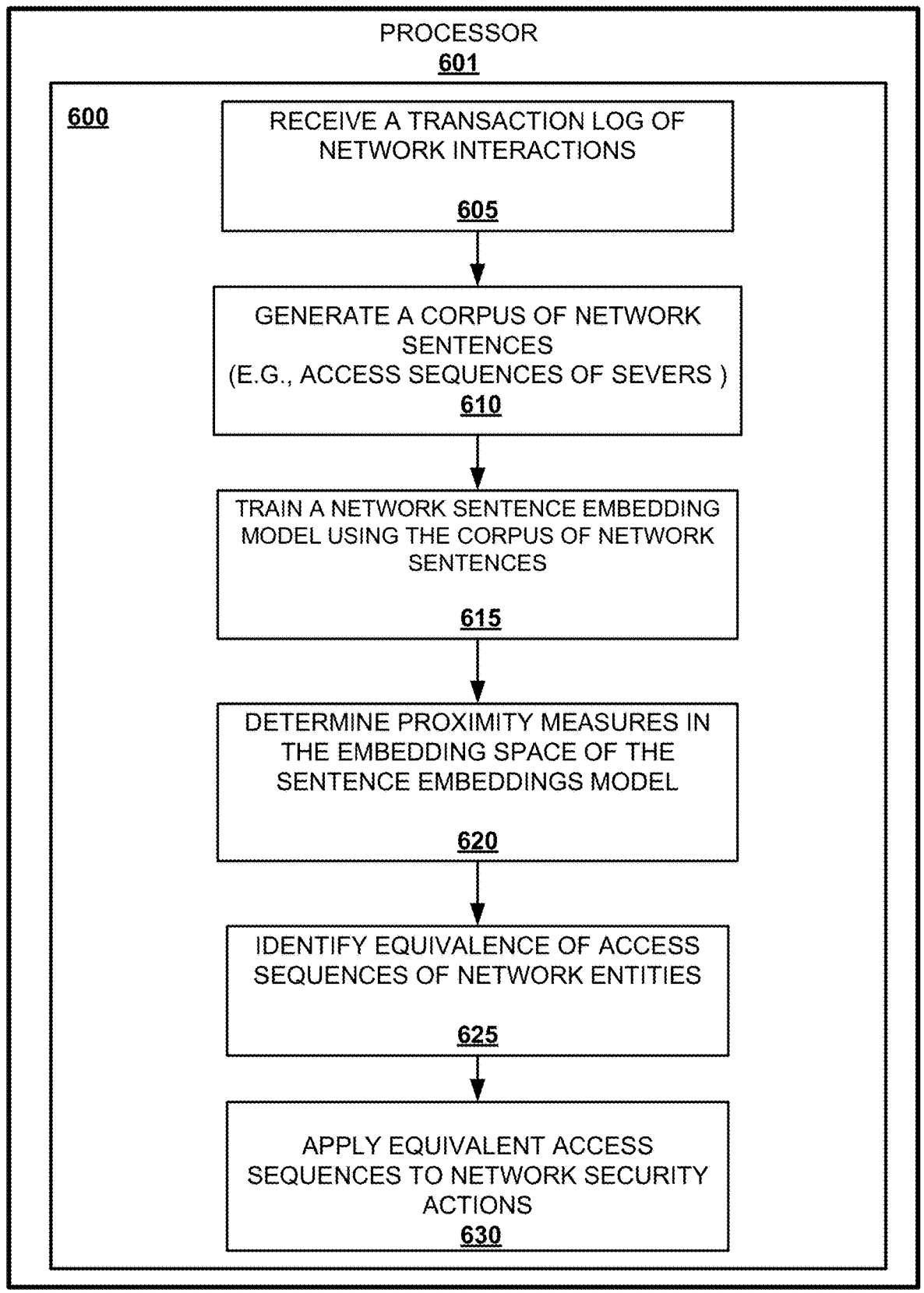
FIG. 6 is an operation flow diagram illustrating an example of a process for executing network analytics by establishing equivalency of access sequencing using network sentence embeddings techniques, according to some embodiments.
Figure 7D:
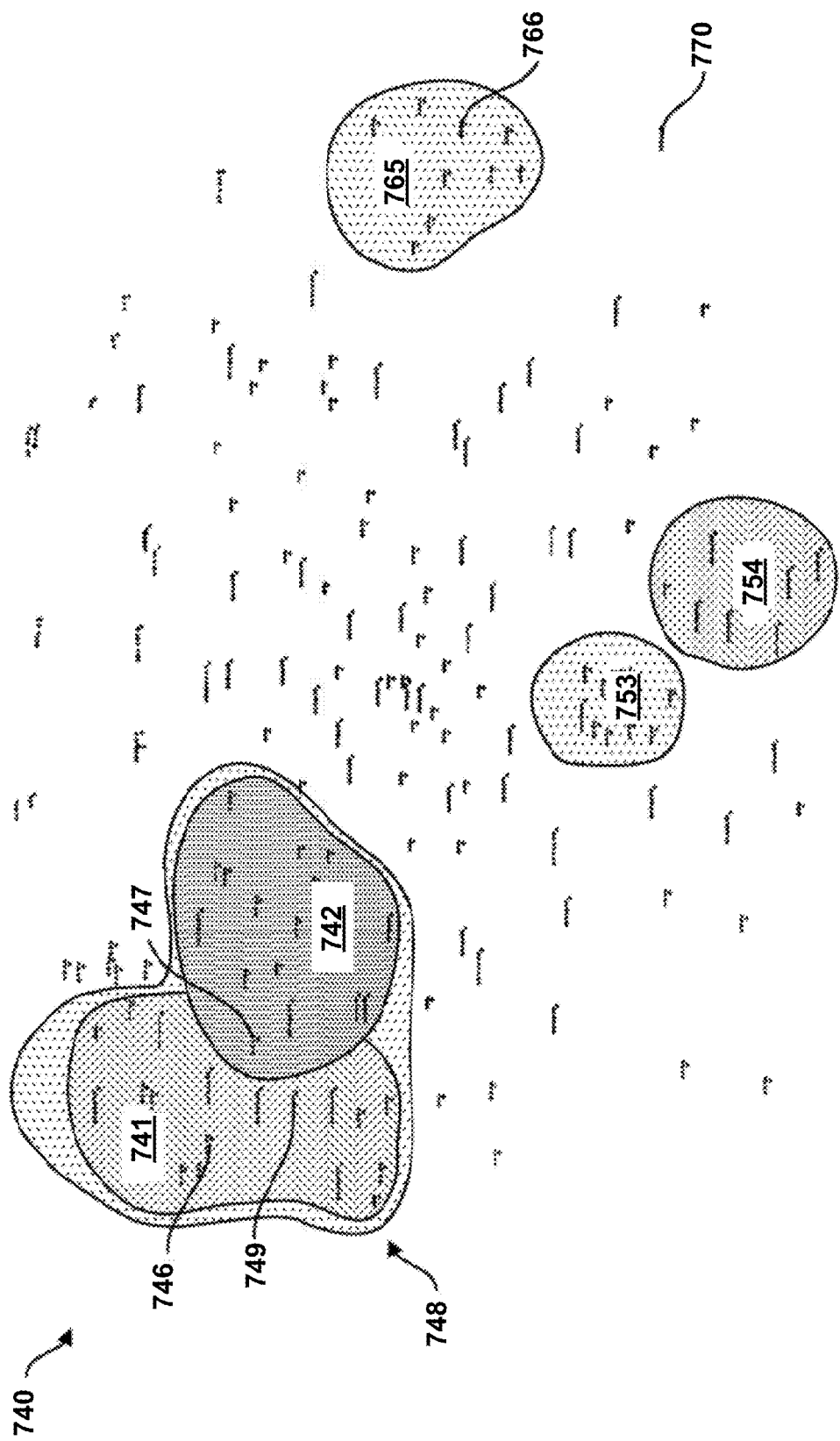
FIG. 7D depicts a semantic visualization map of a crafted corpus of network activity generated using visualization aspects of the network analytics system disclosed herein, according to some embodiments.

Referring now to FIG. 6, an operation flow diagram illustrating an example of a process for executing the disclosed access sequence equivalency techniques is shown. Process 600 is illustrated as a series of executable operations performed by processor 601, which can be the analyzer (shown in FIG. 1), as described above. Processor 601 executes the operations of process 600, thereby implementing the disclosed access sequence equivalency techniques described herein.

The process can begin at operation 605 wherein transaction logs of network interactions are received. For instance, a plurality of transaction records (comprising a transaction log) associated with specific network interactions between entities in a communication network, are received by a network analyzer (shown in FIG. 1). Examples of transaction logs (including information that is indicative of network activity) that can be collected at operation 605 are shown and described above in reference to FIG. 3. Also, in some embodiments, operation 605 can include collecting flow records, such as flow records including DPI information. Moreover, although process 600 is described in relation to transaction logs and flow records, it should be appreciated that network entity prediction can be applied to other types of data that may be high in information content about the network. For instance, NLP-based approaches, namely measuring semantic equivalency, can be applied to network sentences comprised by various types of packets, records, or messages, that enable devices on a network to announce information related to its configurability (e.g., services and associated parameters) and accessibility in a manner that allows the devices to discover, connect, and communicate with each other on the network. In some embodiments, network sentence embeddings approaches can be applied to discovery protocol traffic (and intent to access messages). As an example, metadata from collected packets that may be present in discovery protocol traffic can be analyzed using NLP, such that the information can be used to derive network analytics. Discovery protocols consistent with the present disclosure may include a dynamic host configuration protocol (DHCP), a domain name service (DNS), a multicast DNS (mDNS) protocol, a link layer discovery (LLDP) protocol, a CISCO discovery protocol (CDP), and many more that are low in volume, but high in information content about the network. Applying text-based analysis, namely NLP, to network traffic that has high informational content about the network and the devices thereon, such as discovery protocol messages, is an underlying concept for N LP-driven network analytics.

Additionally, embodiments can include mechanisms for passively collecting and analyzing discovery traffic. For example, the network analytics system disclosed herein can leverage edge devices to listen to discovery protocol traffic within the network, allowing network interactions to be collected in a manner that is passive (e.g., listening, intercepting). Using passive data collection to drive sentence network embeddings can provide advantages over some existing network analytics systems, which employ mechanisms that inject additional traffic into the network that is solely for the purpose of analysis. The system provides a minimal footprint by deploying fewer packet processing devices at strategic points in the network architecture (e.g., edge devices). The process 600 can include applying NLP-driven techniques to discovery protocol traffic (or intent to access messages) in network interactions (e.g., during device discovery and/or advertisement) for network analytics as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety.

Next, the process 600 can continue to operation 610. At operation 610, a corpus of network sentences can be generated from the transaction logs. In some embodiments, a corpus can be crafted, or particularly formulated to capture certain network entities in the embeddings space. In the case of crafted corpuses, generation can be based on a selected corpus category. Thus, operation 610 can produce a crafted corpus (in response to the selected corpus category) that is aligned with the type of access semantics to be captured by an embedding.

Also, during 610, the crafted corpus can be formulated to be consistent with the intended practical use for the process 600. That is, formulating the crafted corpus in a particular manner can control the type of entities that are represented (or otherwise included) within the embeddings space. For example, a corpus that is specifically crafted can yield a network sentence embedding that includes all of the servers on the network in a single embedding space. Furthermore, the dimensions required for applying proximity measures (for semantic equivalence) to network sentence embeddings can be contained by isolating the entity types into different embedding spaces. For instance, to generate a network sentence embedding that includes only the resources in the network, the corpus can be crafted as a collection of network sentences with a sequence of resources accessed in a given day (e.g., grouped by user). This type of crafted corpus may be suitable for applying semantic equivalency to determine whether a monitored sequence of resources that are being accessed by a specific user is equivalent to the known access sequences (established as normal network behavior for the user); or whether the monitored access sequence is an outlier that diverges from other access sequences for the user (e.g., not equivalent), thereby signifying a potential security threat.

Also, to generate a network sentence embedding that includes the resources across networks, the corpus can be crafted as a collection of network sentences with a sequence of resources accessed in a given day (e.g., grouped by user) for each network to be analyzed. This type of crafted corpus may be suitable for applying semantic equivalency to determine whether a monitored sequence of resources that are being accessed by a type of user, for example an employee in the engineering department, at one network site is equivalent to the sequence of resources that are being accessed by the same type of user at another network site. According to this example, semantic equivalency can be used to establish a baseline for the "meaning" of a network sentence that defines acceptable network behavior across the network sites. For instance, referring back to the example discussed in reference to FIG. 1, network sentences in the corpus that correspond to engineering employees can establish a specific "meaning." The "meaning" of these network sentences, in this example, can define that it is nominal network behavior for client devices in a software engineering subnet to access a sequence of servers, where the servers are among types that include: code repository servers, debug servers, and email servers. Using this meaning that is derived from the corpus, the disclosed techniques can determine whether the access sequence for an engineering employee that is currently accessing servers in a network site located in the United States is semantically equivalent to the known access sequences for engineering employees using a network site located in India. This technique allows for security rules that are enforceable based on a semantic equivalency, or the underlying "meaning" of the network activity, as opposed to other network security approaches that are tied to identifiers that may change drastically across several different network sites, such as IP address, and resource names. Generally speaking, in this practical application, the corpus can be crafted such that network sentences have "meanings" with respect to the semantic equivalency of sequences of the type of servers being access by the same type of user (across different sites).

According to the embodiments, the crafted corpus can be formulated to produce embeddings space representations that isolate specific entity types based on the intended use of the system, including: isolating servers (or other resource), isolating users, isolating applications, or isolating entire networks (e.g., from several networks associated with the same company). Also, as alluded to above, sentence network embeddings techniques can include formulating a crafted corpus that is structured in accordance with one of three principal categories, including: 1) a crafted corpus of servers, per user (e.g., per session); 2) a crafted corpus of users, per server (e.g., per day); and 3) a crafted corpus of a group of users, per group of servers accessed (where the same corpus can also have sequence of the source IP of the devices from which the access were made to a server, grouped by the server). Generating a crafted corpus is described in detail in U.S. patent application Ser. No. 16/513522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is incorporated herein in its entirety.

Furthermore, operation 610 can involve various NLP techniques, such as extracting text from the transaction logs received in operation 605, and then applying text-based analysis. In some cases, the plurality of transaction logs can be analyzed using NLP-driven approaches in order to identify the network entities associated with a particular interaction from the information in the transaction records. In other words, operation 610 involves discerning unique parameters in transaction records as text strings that can be further analyzed to distinctly identify various network entities such as users, servers, devices, and the like, as deemed appropriate for analyzing network activity.

In some cases, a subset of transactions can be specifically analyzed, for example based on a particular user and/or temporal identifiers associated with the records. In order to generate the crafted corpus in a manner that is indicative of an access sequence, operation 610 can involve analyzing the various identifiers in transaction records to group related transaction records into subsets. As an example, a subset of transaction records can be analyzed for each user, where the servers that are accessed by each particular user may be identified as text strings within the transaction records (corresponding to a respective user). Accordingly, the crafted corpus generated in operation 610 can include access sequences by grouping the servers extracted from the subset of transaction records for the identified user. An access sequence can further tie the grouping of servers (or other resources) to a sequential order with respect to when these resources where accessed. In a scenario, a user can access a first server in the morning, then a second server in the afternoon. Accordingly, the crafted corpus can be formulated in such a manner (e.g., considering corresponding timestamps) which maintains the time-based sequence, ordering these resources to reflect when they were accessed (in relation to each other). Then, the records in the subset can further analyzed.

In some cases, operation 610 can include regularizing the transactions records which are used in formulating the corpus. Generally, regularization is used to capture semantic meanings of text in the transaction records. Thus, as a result of the regularization, a crafted corpus can be formulated to include network sentences, using natural language terminology to represent the corresponding network interaction. An example of a network sentence is shown in FIG. 5. As such, operation 610 can produce a crafted corpus of network sentences, connecting the text therein to a specific contextual meaning (with respect to language), generally making the sequences in the corpuses more comprehensible (e.g., to human interpretation).

For example, according to the embodiments, network sentences include understandable natural language terms, such as "downloaded" and "morning", providing connotation and underlying context to network activity. That is, a network sentence including the term "morning" signifies a time frame in which the interaction occurred, which is understood based on the meaning of the word. Representing data in a human interpretable way, can help capture the semantics of the interpretations. Additionally, operation 610 can include a step of labeling, such as labeling a group of servers as "engineering servers". As a result, these labels can also be used in the network sentences as another way of imparting the human context into the dataset. As such, operation 610 can produce a crafted corpus which is also referred to herein as a crafted encoded corpus, which generally can make the sequences in the corpuses more comprehensible (e.g., to human interpretation). Also, generating a crafted encoded corpus may, in some instances, reduce extraneous data that is not necessary for ultimately generating the network sentence embeddings.

Additionally, in some cases, operation 610 can further involve formulating the crafted corpus from analyzed transaction records in a manner that is indicative of micro-patterns (e.g., having temporal proximity) for a user. Restated, network interactions for a user may be further grouped within separate contexts based on temporal proximity, even within a specified time period. For instance, operation 610 can be configured to determine a substantial time lapse between groups of transaction records (within the subset of transaction records) for an individual user. As an example a first group of network interactions for a user may occur closely together (e.g., within an hour, with respect to temporal proximity), and then more than 5 hours later within the same day, the user may initiate another group of network interactions that also occur closely together. According to this example, the groups of servers in the crafted corpus representing an access sequence can be further separated into a first group of servers (e.g., morning) and a second group of servers (e.g., evening) in a manner indicating that the network interactions corresponding to the first group of servers and the network interactions corresponding to the second group of servers are separate activity patterns for the identified user. For instance, the crafted corpus can be formulated to represent that a user has a first access pattern that typically includes accessing a first group of servers in the morning, and then another access pattern that typically includes accessing a second group of servers in the evening. In some cases, determining a time lapse can indicate that the groups of servers for the respective groups of transaction records are unrelated for the identified user.

Next, process 600 can proceed to operation 615 to train a network sentence embedding model based on the crafted corpus. According the embodiments, the model can be trained during operation 615 on the corpus of network sentences, as described in detail in reference to FIG. 5. During operation 615, sentence embedding techniques can be applied to the crafted corpus, so as to generate the network sentence embeddings (which embeds multiple dimensions in a single model). Generating network sentence embeddings from network sentences in the corpus, can allow for dimensionality associated with "words" in a network sentence to be captured. As a result, the model can be trained to learn dimensionality, or the particular dimensions correlating to certain sequences of network entities. Learning dimensionality can then drive the model learning the semantic representation of the "meanings" of these network sentences, as alluded to above.

Training the model, during operation 615, can involve receiving network sentences in the crafted corpus, where the network sentences are represented a vectors (e.g., shown in FIG. 2). As a result of NLP-based analysis, operation 615 can produce a network sentence embeddings model where the semantic "meanings" of network sentences are encoded into the embeddings. Generally, a network sentence embeddings model includes embedding text (or dimensions) from the network sentences into a vector space, in a manner that captures contextual similarities of text strings, and further captures the sentence's semantics. As described above, a property of network sentence embeddings is semantic localization. With semantic localization, it can be assumed that network sentences with the same semantic "meanings" are proximate to each other, or co-located, in the embeddings space generated in operation 615. Conversely, network sentences with different semantic "meanings" are further away in the embeddings space generated in operation 615. Accordingly, the network sentence embeddings model can be used to measure proximity between these access sequences captured in the embedding space, which correlates to semantic similarities. Furthermore, two or more access sequences can be classified as being semantically equivalent, based on the measured proximity (e.g., distance) of their embedded "meanings". Additionally, in some instances, the network sentence embeddings model can learn the semantics of polysemous words.

Next, operation 620, can involve determining the proximity measures between network sentences in the embeddings space. In some embodiments, the measuring proximity in the embedding space can be performed by distance in a visualization. As disclosed above, a visualization representing a network sentence embeddings models from the corpus of network sentences can be generated in a reduced space. In other words, the network sentence embeddings model, which is in a multidimensional space, can be translated into a visualization that is generated in a 2D or 3D space, using a NLP-driven visualization technique (e.g., such as t-SNE) where distances between points (e.g., access sequences) can be measured. Referring back to the example of the engineering employee, when a network sentence embeddings model is trained on a corpus including the sequence of engineering servers that are frequently accessed by that user. The resulting embeddings space may capture that these accesses to the same type of servers have similar semantic "meanings", by grouping these sequence of engineering servers in proximity of each other, respectively, in a high-dimensional embeddings space.

The visualization of that network sentence embedding can include visual representations that also reflects the semantic localization of these points within the embeddings space. For instance, accesses to the sequences of engineering servers (determined to be a part of a workflow for the engineering user) can be shown in the visualization as nearby points (also referred to as forming a cluster), having a distance that is visually discernable and measurable. A user can enter user input, such as haptic input using a touch-screen, in order to highlight points in the visualization of the network sentence embeddings (illustrated as circular outlines around points of the visualization in FIG. 1), which allows a software application, for example, to measure a relative distance between the points in the 2D space as a proximity measure between two access sequences.

In some embodiments, operation 620 involves using a hierarchical distance approach for measuring proximity in network sentence embeddings. The hierarchical distance approach is described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. For example, sequences of servers that are commonly accessed by the same user may be measured as having small distances from each other, as determined by the distance algorithm, as a cluster of nodes in the embeddings space.

Next, operation 625 can identify whether access sequences of a network entities, such as severs, are semantically equivalent. That is, after measuring a distance between access sequences in operation 625, their proximity (or lack thereof) can signify whether these access sequences are semantically equivalent. Semantic localization suggests that the semantic "meanings" of network sentences coincides with their position in the embeddings space. Therefore, network sentences that have equivalent semantic "meanings" can be identified in operation 625 by small measured distances, and/or co-located nodes in the embeddings space. In contrast, network sentences that have divergent semantic "meanings" can be identified in operation 625 by large measured distances, and/or co-located nodes in the embeddings space. In some cases, a proximity threshold can be applied to a measured proximity to identify the access sequences as equivalent. For instance, a measured proximity has to be equal to (or closer) than the proximity threshold for the associated access sequences to be considered "equivalent." Otherwise, any measured distance farther than the proximity threshold is considered divergent in operation 625.

In some cases, operation 625 can include label propagation techniques. Label propagation can involve assigning a label to a particular sequence of resources that are accessed (e.g., adding a label in the corpus), and propagating that label to another access sequence that is determined to be semantically "equivalent". As an example, a sequence of engineering servers may be labeled as "valid" with respect to network security for a first engineering employee. Thus, if operation 625 determines that a second sequence of servers access by a second engineering employee is equivalent to the sequence of engineering servers, then the same label of "valid" can be propagated to the second sequence of servers.

For instance, a network embeddings model generated from a crafted corpus of a sequence of servers, can indicate which sequence of servers are commonly requested by a certain user within a certain timeframe. In some cases, a network embeddings model from the crafted corpus formulated in accordance with the above-mentioned corpus categories may define a vector space for servers and another vector space for users. Network embeddings from the crafted corpus of a sequence of users may define a vector space for users and another vector space for servers. In the case of a sequence of users grouped per a group of servers, the network embeddings model allows a relationship to be derived between the sequence of users and the group of servers within the group of servers and within the sequence of users.

Then, at operation 630, establishing equivalence of access sequences can be applied to various network security actions and other forms of network analysis. According to the embodiments, semantic equivalence techniques can be used, for example by a network security system, to detect anomalies with respect to network activity. For instance, a sequence of servers that is accessed by a user can represent nominal network activity for that user (determined by monitoring the user over time). As such, operation 630 can include training the network security system to capture existing behavior of a communication network vis-à-vis the network activity represented in the sentence network embeddings model. Furthermore, the network sentence embeddings model can be leveraged with respect to network security for capturing typical network behavior, as it pertains to a particular user (or group of users), particular server (or group of servers), or a particular network (or group of network sites) over time. In other words, network security actions can use NLP-based analysis of network sentence embeddings in order to observe frequently occurring network activity, or regularly observed patterns in network activity, as nominal behavior in the network. As an example, a sequence of servers that are accessed by a user may be monitored, and compared to a network sentence embeddings model for that user. In the case that the monitored sequence of servers is deemed semantically equivalent to the others sequences that captured in the user's embeddings model (e.g., proximately located to each other in the embeddings space), then operation 630 can approve continued access to servers. Alternatively, if the monitored sequence of servers is determined to be semantically divergent (e.g., distantly located to each other in the embeddings space), then operation 630 can indicate that the access to these servers are an outlier of the user's normal activity, and a potential security threat.

Accordingly, the equivalence techniques analyzes network sentence embeddings model to further identify deviations to identified trends in network activity. As a result, the system can detect activity that may be anomalous. In some implementations, operation 630 includes using additional machine learning techniques. For example, employing a machine learning approach can be implemented using the network sentence embeddings model as data sets. In some cases, multiple crafted corpuses and/or network sentence embeddings models may be employed during operation 630. Therefore, a network security system can be trained, and retrained, using a combined dimensional space. Additionally, crafted corpuses and/or network sentence embeddings models relating to multiple communication networks may be used. Accordingly, a network security system can monitor several different networks in accordance with the techniques disclosed herein. In accordance with some embodiments, operation 630 also includes performing actions that further differentiate between anomalies and simple outliers.

According to some embodiments, the visualization generated (e.g., at operation 615) can be further applied in performing network security and/or network analysis functions. For example, the visualization of a network sentence embeddings model representing access sequences (e.g., patterns for accessing sequences of network entities within a network) can be analyzed to detect suspicious access patterns, such as a user accessing a server that is outside of a group of servers associated with a "meaning" captured in its network sentence embeddings space. In response to detecting a suspicious access pattern or an anomalous access pattern, the visualization can be updated. Some examples of updating the visualization can include: updating the visualization to include interactive elements configured to receive user input; updating the visualization to indicate outliers based on received user input indicating the outliers from suspicious access patterns; updating the visualization to remove outliers; updating the visualization to produce an alert; updating the visualization to include indications of incidents of interest; updating the visualization to include indications relating to deviation in the network embeddings model. Therefore, visualizations of network embeddings can mitigate false positives pertaining to network security (e.g., identify simple outliers), and can to improve the overall accuracy of detecting anomalous network behavior by using network embeddings. Also, in some cases, the visualization can be applied in training the network security system. Various examples of visualizations that may be presented to a user, in accordance with the embodiments, are depicted in FIGS. 7A-7D.

Now referring to FIGS. 7A-7D, examples of visualizations that can be generated as a result of the hierarchal distance techniques as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety.

Figure 8:
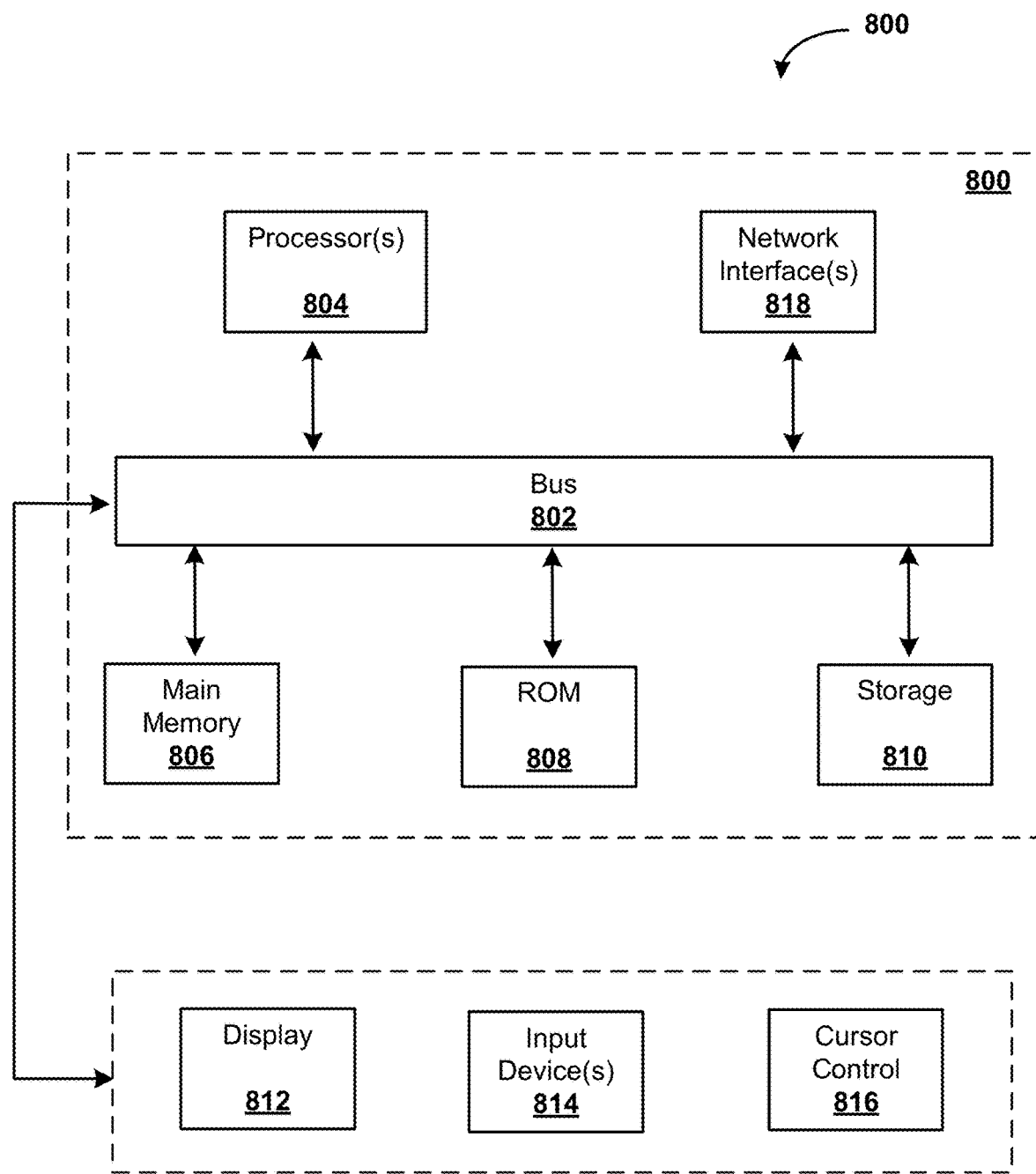
FIG. 8 illustrates an example computing device that may be used in implementing various network analytics using embeddings modeling features relating to the embodiments of the disclosed technology.

FIG. 8 depicts a block diagram of an example computer system 800 which may be used in implementing the equivalence techniques relating to the embodiments of the disclosed technology. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 808, such as a random-access memory (RAM), cache and/or other dynamic storage devices, coupled to bus 802 for storing information and instructions to be executed by processor 804. Main memory 808 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes storage devices 810 such as a read only memory (ROM) or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 700 in response to processor(s) 704 executing one or more sequences of one or more instructions contained in main memory 808. Such instructions may be read into main memory 808 from another storage medium, such as storage device 810. Execution of the sequences of instructions contained in main memory 808 causes processor(s) 804 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 808. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated service digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for analyzing access patterns within a communication network, comprising:
generating, by a network device, a network sentence embeddings model based on a crafted corpus of a plurality of sequences of servers associated with a particular user, wherein the network sentence embeddings model includes an embedding space of text that embeds a semantic meaning of each of a plurality of network sentences in the embedding space and embeds each of the plurality of network sentences at a position in the embedding space;
determining a proximity measure between positions within the embedding space that correspond to two or more network sentences in the embedding space, wherein each of the plurality of network sentences represent an access pattern of the sequences of servers accessed by the particular user within the communication network;
identifying whether the two or more network sentences are proximately positioned from each other in the embedding space or distantly positioned from each other in the embedding space based on the proximity measure, wherein proximately positioned network sentences indicate an equivalence of semantics for the two or more network sentences associated with the particular user and indicates an equivalence of one of the plurality of sequences of servers accessed by the particular user at various access times, and wherein the equivalence of semantics for the two or more network sentences establishes standard network behavior for the particular user; and
upon determining that the two or more network sentences are distantly positioned from each other in the embedding space, detecting a potential security threat associated with the particular user within the communication network with respect to network security based on divergent access patterns associated with the particular user at various times.

2. The method of claim 1, further comprising:
receiving, by the network device, a plurality of transaction records associated with network interactions amongst a plurality of network entities in the communication network;
analyzing, by the network device, the plurality of transaction records to identify the sequences of servers that are accessed by the particular user at various access times within the communication network, wherein the plurality of sequences of servers are identified as text strings using text based analysis; and
upon determining that the two or more network sentences are proximately positioned from each other in the embedding space, detecting nominal network activity within the communication network with respect to network security based on equivalent access patterns associated with the particular user.

3. The method of claim 2, wherein determining that the two or more network sentences are proximately positioned from each other in the embedding space indicates an equivalence of semantics for the sequences of servers accessed by the particular user at various access times that are accessed within the communication network.

4. The method of claim 3, wherein determining that the two or more network sentences are distantly positioned from each other in the embedding space indicates a divergence of the semantics for the two or more network sentences associated with the particular user.

5. The method of claim 4, wherein the divergence of the semantics for the two or more network sentences associated with the particular user further indicates a divergence of one of the plurality of sequences of servers accessed by the particular user at various access times.

6. The method of claim 5, further comprising:
generating, by the network device, the crafted corpus of the plurality of network sentences corresponding to the plurality of transaction records, wherein the two or more network sentences comprise one of the plurality of sequences of servers that are accessed by the particular user within the communication network at various access times.

7. The method of claim 1, further comprising:
adding to the crafted corpus a second plurality of network sentences associated with a second particular user at a second communication network;
adding the second plurality of network sentences to the network sentence embeddings model; and
determining a proximity measure between positions within the embedding space that correspond to a first network sentence associated with a first particular user at a first communication network and a second network sentence associated with the second particular user at the second communication network in the embedding space.

8. The method of claim 7, further comprising:
identifying whether the first network sentence associated with the first particular user at the first communication network and the second network sentence associated with the second particular user at the second communication network are proximately positioned from each other in the embedding space or distantly positioned from each other in the embedding space based on the proximity measure, wherein proximately positioned network sentences indicate an equivalence of semantics of the plurality of network sentences across the first communication network and the second communication network and indicates an equivalence of one of the plurality of sequences of servers accessed by the first particular user at the first communication network and one of the plurality of sequences of servers accessed by the second particular user at the second communication network.

9. The method of claim 7, wherein distantly positioned network sentences indicate a distinction between the first communication network and the second communication network.

10. The method of claim 1, wherein the network sentence embeddings model captures the semantic meaning of each of the plurality of network sentences within the embedding space such that the semantic meaning for each network sentence corresponds to a position of each network sentence within the embedding space.

11. The method of claim 10, wherein the network sentence embeddings model captures the semantic meaning of each of the plurality of network sentences in the embedding space such that network sentences with equivalent semantic meanings have positions that are proximately located within the embedding space.

12. The method of claim 11, wherein measuring proximity between network sentences in the embedding space comprises determining whether the network sentences are proximately located within the embedding space indicating that the network sentences are semantically equivalent.

13. A method for analyzing access patterns across a plurality of communication networks, comprising:
generating, by a network device, a first crafted corpus of a plurality of network sentences corresponding to a plurality of transaction records, wherein the plurality of network sentences comprise sequences of network entities that are accessed within a first communication network;
generating, by the network device, a second crafted corpus of a plurality of network sentences corresponding to a plurality of transaction records, wherein the plurality of network sentences comprise sequences of network entities that are accessed within a second communication network;
generating, by the network device, a network sentence embeddings model based on the first crafted corpus of sequences of network entities and the second crafted corpus of sequences of network entities, wherein the network sentence embeddings model includes an embedding space of text that embeds a semantic meaning of each of the plurality of network sentences in the embedding space and embeds each of the plurality of network sentences at a position in the embedding space;
determining a proximity measure between positions within the embedding space that correspond to a first network sentence associated with a first network in the embedding space and a second network sentence associated with a second network in the embedding space;
identifying whether the first network sentence and the second network sentence are proximately positioned from each other in the embedding space or distantly positioned from each other in the embedding space based on the proximity measure, wherein proximately positioned network sentences indicate an equivalence of semantics for the plurality of network sentences, and wherein the equivalence of semantics for the first and second network sentences establishes standard network behavior for a particular user; and
upon determining that the first network sentence and the second network sentence are distantly positioned from each other in the embedding space, detecting a potential security threat across the first communication network and the second communication network with respect to network security based on divergent access patterns across the plurality of networks.

14. The method of claim 13, further comprising:
upon determining that the first network sentence and the second network sentence are proximately positioned from each other in the embedding space, detecting nominal network activity within one communication network of the plurality of communication networks with respect to network security based on equivalent access patterns across the plurality of communication networks, and wherein the equivalence of semantics for the first network sentence and the second network sentence further indicates an equivalence of semantics for a corresponding sequence of network entities that are accessed within the first communication network and the second communication network.

15. The method of claim 14, wherein determining that the first network sentence and the second network sentence are distantly positioned from each other in the embedding space indicates a divergence of the semantics for the first network sentence and the second network sentence and further indicates a divergence of semantics for the corresponding sequence of network entities that are accessed within the first communication network and the second communication network.

16. A non-transitory machine-readable storage medium comprising instructions executable by a processor, the instructions programming the processor to:
generate a network sentence embeddings model based on a crafted corpus of sequences of servers associated with a particular user, wherein the network sentence embeddings model includes an embedding space of text that embeds a semantic meaning of each of a plurality of network sentences in the embedding space and embeds each of the plurality of network sentences at a position in the embedding space;
determine a proximity measure between positions within the embedding space that correspond to two or more network sentences in the embedding space, wherein each of the plurality of network sentences represent an access pattern of a plurality of sequences of servers accessed by the particular user within a communication network;
identify whether the two or more network sentences are proximately positioned from each other in the embedding space or distantly positioned from each other in the embedding space based on the proximity measure, wherein proximately positioned network sentences indicate an equivalence of semantics for the two or more network sentences and indicate an equivalence of one of the plurality of sequences of servers accessed by the particular user at various times, and wherein the equivalence of semantics for the two or more network sentences establishes standard network behavior for the particular user; and
upon determining that the two or more network sentences are distantly positioned from each other in the embedding space, detect a potential security threat within the communication network with respect to network security based on divergent access patterns associated with the particular user at various times.

17. The non-transitory machine-readable medium of claim 16, comprising additional instructions further programming the processor to:
receive a plurality of transaction records associated with network interactions amongst a plurality of network entities in the communication network;
analyze the plurality of transaction records to identify the sequences of servers that are accessed within the communication network, wherein network entities are identified as text strings using text based analysis; and
upon determining that the two or more network sentences are proximately positioned from each other in the embedding space, detect nominal network activity within the communication network with respect to network security based on equivalent access patterns associated with the particular user at various times.

18. The non-transitory machine-readable medium of claim 17, wherein determining that the two or more network sentences are proximately positioned from each other in the embedding space indicates an equivalence of semantics for the plurality of sequences of network entities that are accessed within the communication network.

19. The non-transitory machine-readable medium of claim 17, wherein determining that the two or more network sentences are distantly positioned from each other in the embedding space indicates a divergence of semantics for the two or more network sentences.

20. The non-transitory machine-readable medium of claim 19, wherein the divergence of semantics for the two or more network sentences associated with the particular user further indicates a divergence of one of the plurality of sequences of network entities accessed by the particular user at various access times.

\* \* \* \* \*